United States Patent
Simon

(10) Patent No.: US 12,058,126 B2
(45) Date of Patent: *Aug. 6, 2024

(54) NETWORK MANAGEMENT USING TRUSTED EXECUTION ENVIRONMENTS

(71) Applicant: Red Hat, Inc., Raleigh, NC (US)

(72) Inventor: Axel Simon, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,954

(22) Filed: Apr. 10, 2023

(65) Prior Publication Data

US 2023/0247020 A1    Aug. 3, 2023

Related U.S. Application Data

(63) Continuation of application No. 17/130,523, filed on Dec. 22, 2020, now Pat. No. 11,627,128.

(51) Int. Cl.
*H04L 9/40* (2022.01)

(52) U.S. Cl.
CPC ...... *H04L 63/0853* (2013.01); *H04L 63/0876* (2013.01); *H04L 63/126* (2013.01)

(58) Field of Classification Search
CPC ............. H04L 63/0853; H04L 63/0876; H04L 63/126

See application file for complete search history.

(56) References Cited

U.S. PATENT DOCUMENTS

| | | | |
|---|---|---|---|
| 2018/0225661 A1* | 8/2018 | Russinovich | G06F 21/53 |
| 2018/0309567 A1* | 10/2018 | Wooden | H04L 63/0428 |
| 2020/0084189 A1* | 3/2020 | Russinovich | G06Q 20/3829 |
| 2020/0394176 A1* | 12/2020 | Wu | G06F 16/22 |

(Continued)

OTHER PUBLICATIONS

Admed-Rengers et al., "Don't Mine, Wait in Line: Fair and Efficient Blockchain Consensus with Robust Round Robin", Retrieved From https://arxiv.org/pdf/1804.07391.pdf, Published May 18, 2020 (Year: 2020).

(Continued)

*Primary Examiner* — Chau Le
(74) *Attorney, Agent, or Firm* — Womble Bond Dickinson (US) LLP

(57) ABSTRACT

The technology disclosed herein enables network consensus management using trusted execution environments. An example method can include: determining, using a processing device associated with a first trusted execution environment (TEE) for a first node of a network in a distributed computing system, that the first node is a leader for a first set of networking transactions processed by the network in the distributed computing system; determining using the processing device associated with the first TEE, whether a second node of the network in the distributed computing system comprises a second TEE that satisfies an authentication threshold; and responsive to determining that the second node comprises the second TEE that satisfies the authentication threshold, setting, using the processing device associated with the first TEE, the second TEE of the second node as the leader for a second set of networking transactions processed by the network in the distributed computing system.

20 Claims, 9 Drawing Sheets

(56) References Cited

U.S. PATENT DOCUMENTS

2022/0103349 A1* 3/2022 Tsirkin .................... G06F 21/53
2022/0303280 A1* 9/2022 Dance .................... H04L 63/126

OTHER PUBLICATIONS

Laurence "Blockchain for Dummies", Published by John Wiley & Sons, Inc., 2017, 272 pages.
Milutinovic et al, "Proof of Luck: an Efficient Blockchain Consensus Protocol", SysTEX, Dec. 16, 2016, 6 pages.

* cited by examiner

NETWORK MANAGEMENT USING TRUSTED EXECUTION ENVIRONMENTS

RELATED APPLICATIONS

This application is a continuation application of co-pending U.S. patent application Ser. No. 17/130,523, filed Dec. 22, 2020, which is incorporated herein by reference.

TECHNICAL FIELD

The present disclosure generally relates to computer systems, and more particularly, to network management using trusted execution environments in computer systems.

BACKGROUND

A trusted execution environment (TEE) is a secure area of a main processor that can guarantee code and data loaded inside to be protected with respect to confidentiality and integrity. A TEE as an isolated execution environment can provide security features such as isolated execution, integrity of applications executing with the TEE, along with confidentiality of stored data. A TEE can provide an execution space with a higher level of security for trusted applications that run on computing devices that are not trusted by the application owner (e.g. a TEE instance).

Network management algorithms are used in computer systems to achieve agreement on data values among distributed processes or nodes in a distributed computer system. Network management algorithms are primarily used to achieve reliability in a network involving multiple distributed nodes.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
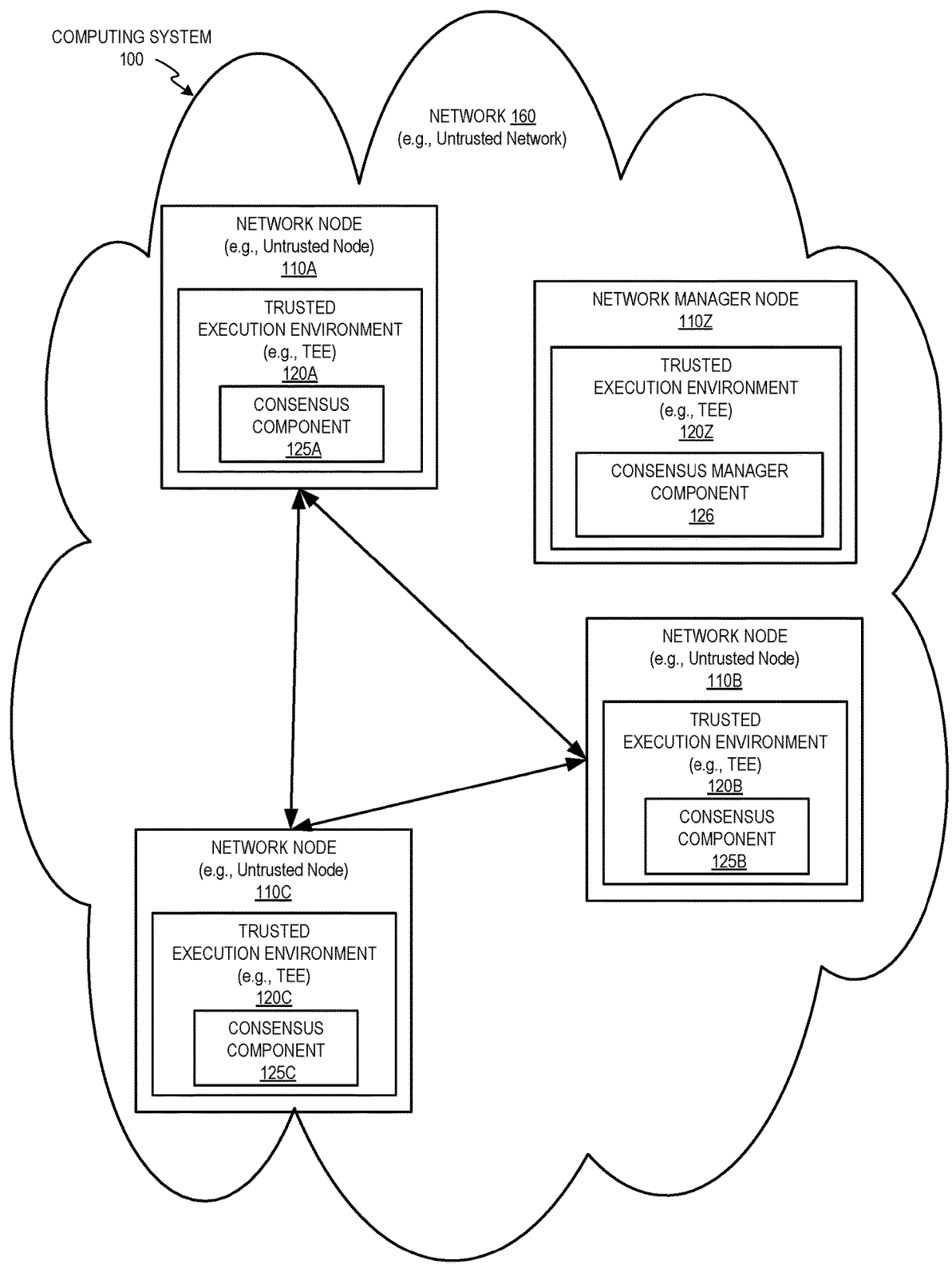
FIG. 1 depicts a high-level block diagram of an example computing environment that facilitates network consensus management using trusted execution environments, in accordance with one or more aspects of the present disclosure.

Described herein are methods and systems for network management using trusted execution environments in computer systems. Consensus mechanisms are used in systems in which multiple separate computer nodes that are part of same or different trust domains (e.g., belonging to entities that do not trust one another) need to reach an agreement on a series of facts and their order to operate reliably. Examples of such systems include blockchains (e.g., distributed ledgers), massively multiplayer online games, telephone networks, aircraft control systems, or cluster based servers. In systems where nodes are part of different entities, it cannot be assumed that each node in a distributed network is reliable and not compromised (e.g., a node that has suffered a fault due to unstable code or has been taken over by a malicious actor). To address this, some conventional distributed computer systems implement consensus algorithms which facilitate agreement between network nodes on the content of networking transactions as well as the order in which the transactions have occurred.

Some conventional systems utilize consensus mechanisms that assume a certain number of nodes in the network have not been compromised. These types of systems, however, involve the use of sophisticated security infrastructure in order to insure that any participating node is not in violation of agreed upon communication rules (e.g., has not been compromised). Other systems utilize algorithms that result in significant energy and processor inefficiencies (such as "proof of work" solutions). Since many conventional implementations assume that participating nodes may not "play by the rules", these solutions incorporate increased complexity, leading to increased inefficiency and increased costs.

Aspects of the present disclosure address the above and other deficiencies by implementing technology to facilitate network consensus management using trusted execution environments. Trusted execution environments (TEEs) offer a capability referred to as "remote attestation" which allows one party (or node) to ensure that code executing within a TEE instance on another party's (or other node's) CPU can be verified as long as the CPU can be trusted (e.g., via the hardware vendor's cryptographic certificate). TEEs additionally provide integrity protection that can prevent code running inside the TEE from being modified without authorization. Moreover, TEEs can provide a hardware random-number generator (HRNG) that can be utilized to securely facilitate node selection when selecting a node as manager (or leader) of the consensus process for a group of transactions (e.g., a "round").

In one implementation, decentralized consensus management can be implemented by utilizing a communication component (also referred to herein as a consensus component) in each node of a network in a distributed computing system. A node can establish a TEE instance and load the consensus component in the TEE instance for execution. The consensus component can determine if the node is the first node in the network and if so, make itself the leader (also referred to as a consensus leader) for a round of networking transactions. At the conclusion of a round of transactions, the consensus component can select another node from the network to act as the consensus leader for the next round of networking transactions for the network. The consensus component can utilize the HRNG of the TEE to randomly (or pseudo-randomly) select another node, then utilize the remote attestation process to authenticate that node as being trustworthy. If the remote attestation process authenticates the TEE instance of the candidate node, the consensus leadership responsibility can be passed to the TEE instance of the candidate node for the next round of transactions. Then, that node can repeat the same process to select the next consensus leader for the next round.

In another implementation, centralized consensus management can be implemented by utilizing a communication manager component (also referred to herein as a consensus manager component) in a network manager node for the network. The consensus manager component can act as the centralized arbiter of determining which node in the network is to act as the consensus leader for each round of networking transactions. The consensus manager component can establish a TEE instance in the network manager node, monitor the networking traffic or be handed private networking traffic with the means to analyze that traffic (e.g., in a blockchain network designed to operate using encrypted channels), and at the conclusion of each round, randomly (or pseudo-randomly) select a node to act as the next consensus leader, and perform remote attestation for the selected node to verify that the selected node is executing a TEE instance that includes an authenticated version of the consensus component.

Aspects of the present disclosure present advantages over conventional solutions to the issues noted above. First, utilizing a TEE instance to provision the executable code for the consensus component provides a more secure and efficient method of authenticating participating network nodes. The remote attestation process can verify that the code running on a network node that is a candidate to be a consensus leader for the next round of transactions is compatible with the code that is running on the node that is acting as the consensus leader for the current round of transactions. This, in turn, can eliminate complex authentication rules implemented by conventional systems to insure that nodes are trustworthy participants. Additionally, utilizing the hardware random number generator of the TEE provides a more secure method of performing the node selection process randomly (or pseudo-randomly). This is particularly useful in systems where multiple mutually untrustworthy parties collaborate together. It provides the advantage of reducing computational complexity, freeing up resources to be used for other purposes. Moreover, by improving the efficiency of the consensus process, the efficiency of the overall network can be significantly improved. This, in turn, can significantly improve efficiency and security as well as decrease resource requirements involved in deployment across a cloud computing environment that includes multiple host computing devices.

FIG. 1 depicts an illustrative architecture of elements of a computing system 100, in accordance with an example of the present disclosure. It should be noted that other architectures for computing environment 100 are possible, and that the implementation of a computing environment utilizing embodiments of the disclosure are not necessarily limited to the specific architecture depicted. In the example shown in FIG. 1, computing environment 100 may include one or more network nodes 110A-C, a network manager node 110Z, operating within an untrusted network 160. Each of network nodes 110A-C and 110Z can be hosted by one or more computing devices (not pictured) that are capable of supporting trusted execution environments.

Computing devices within network 160 may include any computing devices that are capable of storing or accessing data and may include one or more servers, workstations, desktop computers, laptop computers, tablet computers, mobile phones, palm-sized computing devices, personal digital assistants (PDAs), smart watches, robotic devices (e.g., drones, autonomous vehicles), data storage device (e.g., USB drive), other device, or a combination thereof. Computing devices 110A-B may include one or more hardware processors based on x86, PowerPC®, SPARC®, ARM®, other hardware, or a combination thereof.

Network 160 may include one or more public networks (e.g., the Internet), private networks (e.g., a local area network (LAN) or wide area network (WAN)), or a combination thereof. Network 160 may include a wired or a wireless infrastructure, which may be provided by one or more wireless communications systems, such as a wireless fidelity (WiFi) hotspot connected with the network 160 and/or a wireless carrier system that can be implemented using various data processing equipment, communication towers, etc. In one example, network 160A may include one or more trusted networks. A trusted network may include security enhanced features that restrict access and use of network 160 to particular users and devices of an organization (e.g., intranet of a business entity). An untrusted network (e.g., intranet) may not provide the same level of security enhanced features as the trusted network and may be available for public access and use.

Each of nodes 110A-C may operate within network 160 as part of different trust domains (e.g., may be part of different networks or computing devices that do not trust each other). Each of nodes 110A-C may need to come to an agreement on a series of facts and their order to operate within network 160. In various implementations, the series of facts (e.g., networking transactions) may be observed, processed, or passed between each of the nodes. As noted above, each node may process transactions and determine the content and order of the transactions. Transactions can be processed in sets or "rounds" where at the end of each round a consensus is to be reached with regards to order and content of the set. To establish the consensus, one of the nodes in network 160 is designated as the consensus "leader" that is the arbiter of the content and order of the transactions for a particular round. The consensus leader can store and aggregate the transactions for a round. At the end of a round, the consensus leader can report out the content and order it observed so that it can be used by the other nodes as the final content and order of the transactions in that round. Any discrepancies between what is observed by the leader and another node in the network is resolved in favor of the determination made by the leader.

Each network node 110 can establish a TEE 120. When a node 110 joins the network, consensus component 125 can be loaded into the TEE 120 to be used to facilitate decentralized consensus management for the transactions processed by the nodes in the network. Consensus component 125 may include executable data, configuration data, other data, or a combination thereof and may be stored and executed in the trusted execution environment 120. The executable code of consensus component 125 may be stored in any format and may include one or more file system objects (e.g., files, directories, links), database objects (e.g., records, tables, field value pairs, tuples), other storage objects, or a combination thereof.

In an illustrative example, as network node 110A joins the network it can establish a TEE 120A (e.g. a TEE instance) and load consensus component 125A in TEE 120A for execution. In various implementations, consensus component 125A can determine whether node 110A is the first node to join network 160. If so, consensus component 125A can determine that node 110A is the consensus leader for the first round of networking transactions processed by the network. Thus, node 110A can track the content and order of any transactions processed by the network for that round. In various implementations, transactions can be received directly from other nodes 110B-C, or indirectly (e.g., 110B sends data to 110C, and 110C send the data to 110A). Once the round has ended (e.g., the set of transactions satisfies a threshold with respect to amount, elapsed time, etc.), consensus component 125A can select one of the other nodes in the network 160 to act as consensus leader for the next round.

In various implementations, consensus component 125A uses the random number generator component of TEE 120A to select one of the other nodes in network 160 (e.g., one of nodes 110B or 110C). Consensus component 125A can then authenticate the selected node by performing a remote attestation operation to verify that the selected node is executing a compatible version of the consensus component in its own TEE. A version is compatible if at least some portions of the code are identical, backward compatible, or forward compatible to that executing in the TEE of the current leader. If the selected node is authenticated by the remote attestation operation, the consensus component 125A sets the selected node as the consensus leader for the next round of transactions processed by network 160.

For example, if consensus component 125A randomly selects node 110B, and performs a remote attestation operation that authenticates consensus component 125B as compatible with consensus component 125A, then node 110B can be set as the leader for the next round. Subsequently, consensus component 125A can broadcast the results of the current round to nodes 110B and 110C, then hand off leadership responsibility to node 110B. Consensus component 125B in Node 110B can then repeat the process, aggregating the network transaction activity for the next round, and at the conclusion of the round, select another node using the same selection and authentication process.

In some implementations, the selection of the consensus leader for each round can be centralized in a network manager node (e.g., network manager node 110Z) that makes all leader determinations. In such instances, the network manager node 110Z can include a TEE that executes consensus manager component 126 to select and authenticate a consensus leader node for each round. In these implementations, the random (or pseudo-random) selection and remote attestation are performed by consensus manager component 126. Once a leader node is selected, the transaction management and consensus determinations are completed by the consensus component of the leader node for that round. At the conclusion of the round, the consensus manager component 126 is invoked to select and authenticate a new consensus leader node for the next round.

It should be noted that for clarity of illustration only three nodes have been depicted in FIG. 1. However, in other implementations, more or fewer nodes can be part of network 160. Additionally, while network manager node 110Z is present in FIG. 1, in some decentralized implementations, no network manager node may be operating in network 160. Consensus component 125A-C are described in further detail below with respect to FIG. 5. Consensus manager component 126 is described in further detail below with respect to FIG. 6.

Trusted execution environments 120A-C, Z may use encryption to isolate the data of a process (e.g., user space process, VM, container) from other processes running on the same computing device. In one example, the data of a process executing in the trusted execution environment may be encrypted using cryptographic keys provided by the tenant that are accessible to a hardware processor of the computing device but are inaccessible to all the processes running on the computing device (e.g., hardware level encryption). The hardware processor may encrypt or decrypt the data of the process executing in the trusted execution environment when the process stores or accesses the data. This enables the trusted execution environment to isolate data of a lower privileged process (e.g., application process or virtual machine process) executing within the trusted execution environment from being accessed by a higher privileged processes (e.g., kernel or hypervisor) even though the higher privileged processes may be responsible for managing the lower privileged process. Trusted execution environment may provide code execution, storage confidentiality, and integrity protection, and may store, execute, and isolate protected content from other processes executing on the same computing device, as discussed in more detail in regards to FIG. 2.

Trusted execution environments 120, 130 may be ephemeral execution environments that comprise non-persistent storage of computing device 110B and may or may not persistently store data on a persistent storage device (not pictured). The non-persistent storage may include data storage devices that lose data in response to a power interruption and may include volatile memory (e.g., main memory), processor registers (e.g., CPU or GPU registers), other non-persistent cache, or a combination thereof. A persistent storage device may be internal to computing device 110B and accessible over a device bus or may be external to computing device 110B and accessible over a network connection (e.g., communication channel).

Figure 2:
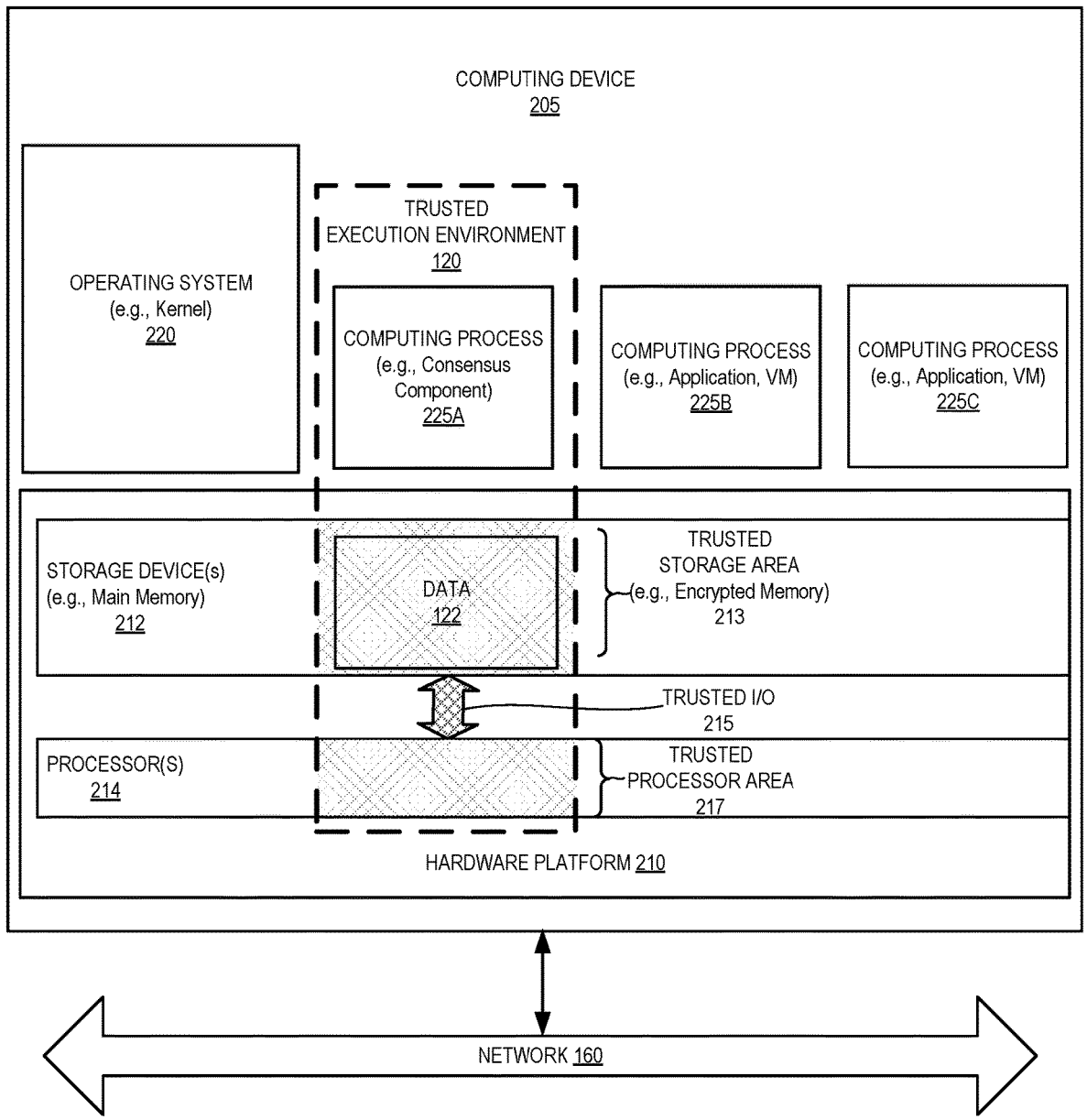
FIG. 2 depicts a block diagram of an example computing device that includes an instance of a trusted execution environment that can facilitate network consensus management, in accordance with one or more aspects of the present disclosure.

FIG. 2 depicts an example of a set of trusted execution environments established in computing device 205, in accordance with an embodiment of the present disclosure. Computing device 205 may be the same or similar to one or more of computing devices that host network nodes 110A-C and/or network manager node 110Z of FIG. 1 and may include a hardware platform 210, trusted execution environment 120, an operating system 220, one or more computing processes 225A-C, and a network 160. It should be noted that other architectures for computing device 205 are possible, and that the implementations of the computing device utilizing embodiments of the disclosure are not necessarily limited to the specific architecture depicted.

Hardware platform 210 may include one or more hardware devices that perform computing tasks for computing device 205. Hardware platform 210 may include one or more data storage devices, computer processors, Basic Input Output services (BIOS), code (e.g., firmware), other aspects, or a combination thereof. One or more devices of the hardware platform 210 may be combined or consolidated into one or more physical devices or may partially or completely emulated as a virtual device or virtual machine. Hardware platform 210 may include one or more storage devices 212 and processors 214.

Storage devices 212 may include any data storage device that is capable of storing data and may include physical memory devices. The physical memory devices may include volatile memory devices (e.g., RAM, DRAM, SRAM), non-volatile memory devices (e.g., NVRAM), other types of memory devices, or a combination thereof. Storage devices 212 may also or alternatively include mass storage devices, such as hard drives (e.g., Hard Disk Drives (HDD)), solid-state storage (e.g., Solid State Drives (SSD)), other persistent data storage, or a combination thereof. Storage devices 212 may be capable of storing data 122 associated with computing processes 225A. In one example, data of computing process 225A may be received from a device that is internal or external to computing device 205. The data may be encrypted using a cryptographic key that was provided (e.g., determined, derived, generated, assigned) by computing device 205 or by a different computing device. The received data may be decrypted using the same cryptographic key or a derivative of the cryptographic key and the decrypted data may be loaded into the trusted execution environment 120 (as shown by data 122) before, during or after being re-encrypted.

Processors 214 may be communicably coupled to storage devices 212 and be capable of executing instructions encoding arithmetic, logical, or I/O operations. Processors 214 may include one or more general processors, Central Processing Units (CPUs), Graphical Processing Units (GPUs), Application Specific Integrated Circuits (ASICs), secure cryptoprocessors, Secure Elements (SE), Hardware Security Module (HSM), other processing unit, or a combination thereof. Processors 214 may be a single core processor, which may be capable of executing one instruction at a time (e.g., single pipeline of instructions) or a multi-core processor, which may simultaneously execute multiple instructions. Processors 214 may interact with storage devices 212 and provide one or more features defined by or offered by trusted systems, trusted computing, trusted computing base (TCB), trusted platform module (TPM), hardware security module (HSM), secure element (SE), other features, or a combination thereof.

Processors 214 may establish a trusted execution environment across multiple hardware devices of hardware platform 210 (e.g., processor and storage devices) and may include instructions (e.g., opcodes) to initiate, configure, and maintain the trusted execution environment 120. In one example, a trusted execution environment may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, IBM PEF, RISC-V Sanctum, other technology, or a combination thereof.

Trusted execution environment 120 may be a security enhanced area in computing device 205 that may guard the data of a computing process from being accessed by other computing processes on computing device 205. A trusted execution environment may enhance security by enhancing confidentiality (e.g., reducing unauthorized access), integrity (e.g., reduce unauthorized modifications), availability (e.g., enable authorized access), non-repudiation (e.g., action association), other aspect of digital security or data security, or a combination thereof. Trusted execution environments 120 may be the same or similar to a trust domain, trust zone, other term, or a combination hereof. Trusted execution environment 120 may protect data 122 while data 122 is in use (e.g., processed by processor 214), is in motion (e.g., transmitted over network 160), is at rest (e.g., stored in storage device 212), or a combinational thereof. Trusted execution environments 120 may be a set of one or more trusted execution environments and each of the trusted execution environments may be referred to as an instance of a trusted execution environment (i.e., TEE instance). Each trusted execution environment 120 may isolate data of at least one process executed in trusted execution environment 120 from processes executing external to the trusted execution environment. The at least one process may be a set of one or more processes associated with an execution construct being guarded by the trusted execution environment 120.

The execution construct may be a virtual machine, container, computing process, thread, instruction stream, or a combination thereof. In one example, trusted execution environment 120 may execute a particular virtual machine (e.g., VM based TEE) and may guard data of the virtual machine from a hypervisor managing the virtual machine. In this example, computing device 205 may execute executable code in trusted execution environment 120 as a virtual machine process and the executable code in the trusted execution environment may be accessible to the virtual machine process and inaccessible to a hypervisor managing the virtual machine process. As such, the trusted execution environment 120 of computing device may host a virtual machine that executes the executable data and all the data in the trusted execution environment may be accessible to the virtual machine and inaccessible to a hypervisor managing the virtual machine.

In another example, trusted execution environment 120 may be associated with a particular computing process (e.g., process based TEE) and may guard data of the particular computing process from being accessed by other equally privileged, higher privileged, or lower privileged computing processes (e.g., guard application process against higher privileged Operating System (OS) process). In this example, computing device 110 may execute the executable code in trusted execution environment 120 as one or more application processes and the executable code in the trusted execution environment 120 may be accessible to the one or more application processes and inaccessible to a kernel managing the one or more application processes. As such, trusted execution environment 120 of computing device 205 may host one or more application processes (e.g., a consensus component, a consensus management component, etc.) that execute the executable data and the data in the trusted execution environment may be accessible to the one or more application processes and be inaccessible to a kernel managing the one or more application processes. In either example, the data in the trusted execution environment 120 may be guarded by storing the data 122 in a trusted storage area 213.

Trusted storage area 213 may be an area of one or more storage devices 212 that stores data of a computing process. Trusted storage area 213 may be a part of trusted execution environment 120 and may store data 122 of computing process 225A (e.g., a consensus component, a consensus management component, etc.) in an encrypted form. Data 122 may be encrypted and decrypted by hardware devices using cryptographic input that includes one or more cryptographic keys. In one example, the cryptographic keys may be accessible to the hardware devices (e.g., processor 214) and may be inaccessible to operating system level processes executed by the hardware device. In another example, the cryptographic keys may be accessible to hardware devices and one or more computing processes, such as, the computing process associated with the trusted execution environment. In either example, the encryption and decryption performed by the hardware device may be referred to as hardware based encryption, hardware level encryption, hardware assisted encryption, hardware enforced encryption, process transparent encryption, other term, or a combination thereof and may use cryptographic key data (e.g., encryption and decryption keys) that are accessible to the processor and are inaccessible to all processes executed external to the trusted execution environment 120.

Trusted storage area 213 may include a portion of memory and may be referred to as an encrypted memory area. An encrypted memory area may be a contiguous or non-contiguous portion of virtual memory, logical memory, physical memory, other storage abstraction, or a combination thereof. The encrypted memory area may correspond to or be mapped to a portion of primary memory (e.g., main memory), auxiliary memory (e.g., solid state storage), adapter memory (e.g., memory of graphics card, or network interface cart), other persistent or non-persistent storage, or a combination thereof. In one example, the encrypted memory area may be a portion of main memory associated with a particular process and the processor may encrypt the data when storing the data in the memory area and may decrypt the data when retrieving the data from the memory area. The data in the memory area may be transformed (e.g., encrypted or decrypted) before, during, or after it is stored in or retrieved from the memory area and may remain in an encrypted form while in the encrypted memory area.

Trusted storage area 213 may store the data in one or more storage units. The storage units may be logical or physical units of data storage for managing the data (e.g., storing, organizing, or accessing the data). A storage unit may include a contiguous or non-contiguous sequence of bytes or bits. In one example, a storage unit may be a virtual representation of underlying physical storage units, which may be referred to as physical storage blocks. Storage units may have a unit size that is the same or different from a physical block size provided by an underlying hardware resource. The storage unit may include volatile or non-volatile data storage. In one example, storage units may be a memory segment and each memory segment may correspond to an individual memory page, multiple memory pages, or a portion of a memory page. In other examples, each of the storage units may correspond to a portion (e.g., block, sector) of a mass storage device (e.g., hard disk storage, solid state storage). The data in the storage units of trusted storage area 213 may be transmitted to other hardware devices using trusted IO 215.

Trusted IO 215 may enable the data of a computing process to be transmitted between hardware devices in a security enhanced manner. The data may be transmitted over one or more system buses, networks, or other communication channel in an encrypted or partially encrypted form. This may be advantageous because transmitting the data in an encrypted form may limit the ability of the data to be snooped while being transmitted between hardware devices. As shown in FIG. 2, trusted IO 215 may enable the data of computing process 225A to be transmitted between trusted storage area 213 and trusted processor area 217.

Trusted processor area 217 may be a portion of processor 214 that is associated with computing process 225A and guards data of computing process 225 from being accessed or modified by computing processes 225B. Trusted processor area 217 may include a portion of processor 214 that stores the data (e.g., CPU cache, processor memory or registers) and a portion of processor 214 that executes the data (e.g., processor core). Trusted processor area 217 may store the data in an encrypted form or in a decrypted form when it is present on the processor and in either example, the data of the computing process may be protected from being accessed or modified by other processes via the design of the processor and encryption may not be required to ensure isolation of the data when the data is within the processor packaging (e.g., chip packaging).

Computing device 205 may use the same processor and storage device to establish multiple instances of trusted execution environment 120. Each instance of a trusted execution environment (e.g., TEE instance, TEEi) may be established for a particular set of one or more computing processes and may be associated with a particular memory encrypted area. The instances of a trusted execution environment may be provided by the same hardware (e.g., processor and memory) but each instance may be associated with a different memory encrypted area and a different set of one or more processes (e.g., set including an individual process or set of all processes of a VM). Each instance may guard all data of a computing process or a portion of the data of a computing process. For example, computing process 225A (e.g., application or VM) may be associated with both a trusted execution environment and an untrusted execution environment. In this situation, a first portion of the data of computing process 225A may be stored and/or executed within trusted execution environment 120 and a second portion of the data of computing process 225A may be stored and/or executed within an untrusted execution environment. The second portion may be stored in the same storage device as the first portion but the second portion may be stored in a decrypted form and may be executed by processor 214 in a manner that enables another process (e.g., multiple higher privileged processes) to access or modify the data. In either example, trusted execution environment may be used to execute one or more of the computing processes 225A.

Each of the computing processes 225A may include one or more streams of execution for executing programmed instructions. A stream of instructions may include a sequence of instructions that can be executed by one or more processors. Each of the computing processes may be managed by an operating system 220 or may be part of an operating system (e.g., kernel, not shown). In one example, a computing process may be an instance of a computer program that is being executed and may contain program code (e.g., executable code, executable data) and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes 225A may correspond to one or more applications, containers, virtual machines, secure enclaves, or a combination thereof. Applications may be programs executing with user space privileges and may be referred to as application processes, system processes, services, background processes, or user space processes. A user space process (e.g., user mode process, user privilege process) may have lower level privileges that provide the user space process access to a user space portion of data storage without having access to a kernel space portion of data storage. In contrast, a kernel process may have higher privileges that provide the kernel process access to a kernel space portion and to user space portions that are not guarded by a trusted execution environment. In one example, the privilege associated with a user space process may change during execution and a computing process executing in user space (e.g., user mode, user land) may be granted enhanced privileges by an operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

The privilege levels of a computing process may be the same or similar to protection levels of processor 214 (e.g., processor protection rings) and may indicate an access level of a computing process to hardware resources (e.g., virtual or physical resources). There may be multiple different privilege levels assigned to the computing process. In one example, the privilege levels may correspond generally to either a user space privilege level or a kernel privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

Operating system 220 may include one or more programs that are run to manage one or more of the computing processes 225A. Operating system 220 may include a kernel that execute as one or more kernel processes and may manage access to physical or virtual resources provided by hardware devices. A kernel process may be an example of a computing process associated with a higher privilege level (e.g., hypervisor privilege, kernel privilege, kernel mode, kernel space, protection ring 0). In one example, operating system 220 may be a host operating system, guest operating system, or a portion thereof and the computing processes 225A-C may be different applications that are executing as user space processes. In another example, operating system 220 may be a hypervisor that provides hardware virtualization features and the computing processes 225A may be different virtual machines. In yet another example, operating system may include a container runtime (e.g., Docker, Container Linux, CRI-O, Podman, or the like) that provides operating system level virtualization and the computing processes 225A may be different containers. In further examples, operating system 220 may provide a combination thereof (e.g., hardware virtualization and operating system level virtualization).

The kernel of operating system 220 may segregate storage devices 212 (e.g., main memory, hard disk) into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with both diminished privileges (e.g., user space mode, user space privilege) and those with enhanced privileges. In one example, the portion of storage devices 212 associated with the enhanced privileges may be designated as kernel space and the portion of storage devices 212 associated with the diminished privileges may be designated as user space. In other examples, there may be more or less than two portions.

When the kernel provides features of a hypervisor it may also be known as a virtual machine monitor (VMM) and may provide virtual machines with access to one or more features of the underlying hardware devices. A hypervisor may run directly on the hardware of computing device 205 (e.g., host machine) or may run on or within a host operating system (not shown). The hypervisor may manage system resources, including access to hardware devices. The hypervisor may be implemented as executable code and may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc.

Figure 3:
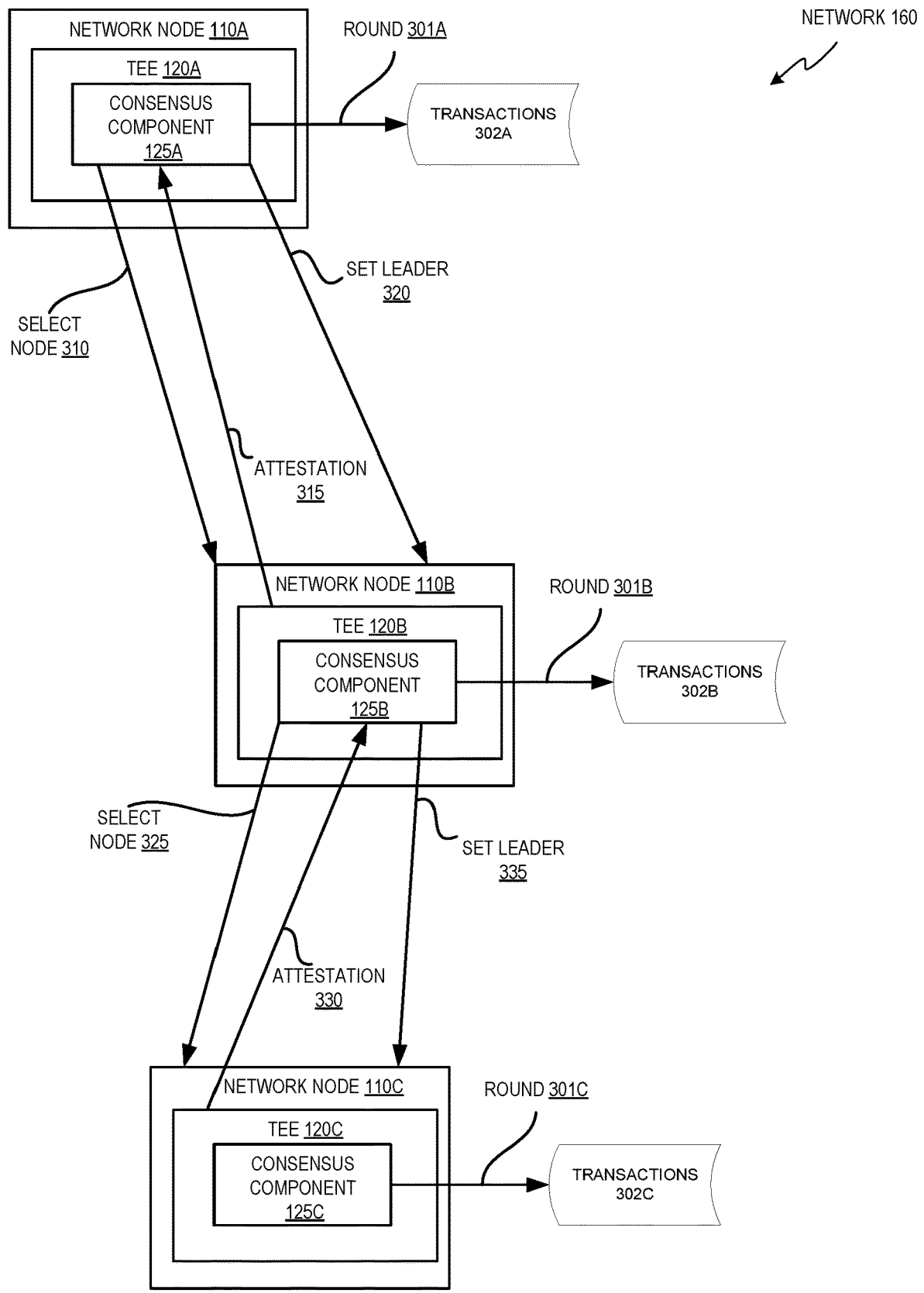
FIG. 3 depicts an illustration of decentralized network consensus management using trusted execution environments, in accordance with one or more aspects of the present disclosure.

FIG. 3 depicts an illustration of a facilitating decentralized networking consensus management using trusted execution environments. As shown in FIG. 3, network node 110A is the first node to join network 160. The consensus component 125A is loaded into and executed within TEE 120A. Since node 110A is the first node in the network, consensus component 125A sets node 110A as the consensus leader for network transaction round 301A. Consensus component 125A manages transactions 302A until it determines that the transactions 302A for round 301A satisfies a threshold (e.g., a threshold number of transactions, a threshold period of time, etc.). Once this threshold has been satisfied, consensus component 125A selects another node in network 160 (depicted by "select node 310") to act as consensus leader for the next round of transactions (e.g., round 301B). As described in further detail below in FIG. 5, consensus component 125A can invoke the random number generator associated with TEE 120A to make the selection.

As shown in FIG. 3, consensus component 125A selects node 110B ("select node 310"). Consensus component 125A can then authenticate the consensus component 125B executing in TEE 120B of node 110B by performing attestation operation 315. If the attestation operation 315 indicates that consensus component 125B is compatible with consensus component 125A, network node 110B is set as the consensus leader for the next round (depicted by "set leader 320"). Consensus component 125A can then report out a summary of the transactions 302A in round 301A to nodes 110B and 110C.

Consensus component 125B manages transactions 302B until it determines that the transactions 302B for round 301B satisfies the threshold (e.g., a threshold number of transactions, a threshold period of time, etc.). Once this threshold has been satisfied for round 301B, consensus component 125B selects another node in network 160 (depicted by "select node 325") to act as consensus leader for the next round of transactions (e.g., round 301C). Consensus component 125B can invoke the random number generator associated with TEE 120B to make the selection. As shown, consensus component 125B selects node 110C (depicted by "select node 325"). Consensus component 125B can then authenticate the consensus component 125C executing in TEE 120C of node 110C by performing attestation operation 330. If the attestation operation 330 indicates that consensus component 125C is compatible with consensus component 125B, network node 110C is set as the consensus leader for the next round (depicted by "set leader 335"). Consensus component 125B can then report out a summary of the transactions 302B in round 301B to nodes 110A and 110C.

Consensus component 125C can then repeat the above process to select the consensus leader node for the next round of transactions. Note that for ease of illustration a particular order of node selection has been depicted with a particular number of rounds. In other implementations, aspects of the present disclosure can be applied to more or fewer nodes, using more or fewer rounds. Similarly, the order of node selection can be different from that depicted in FIG. 3.

Figure 4:
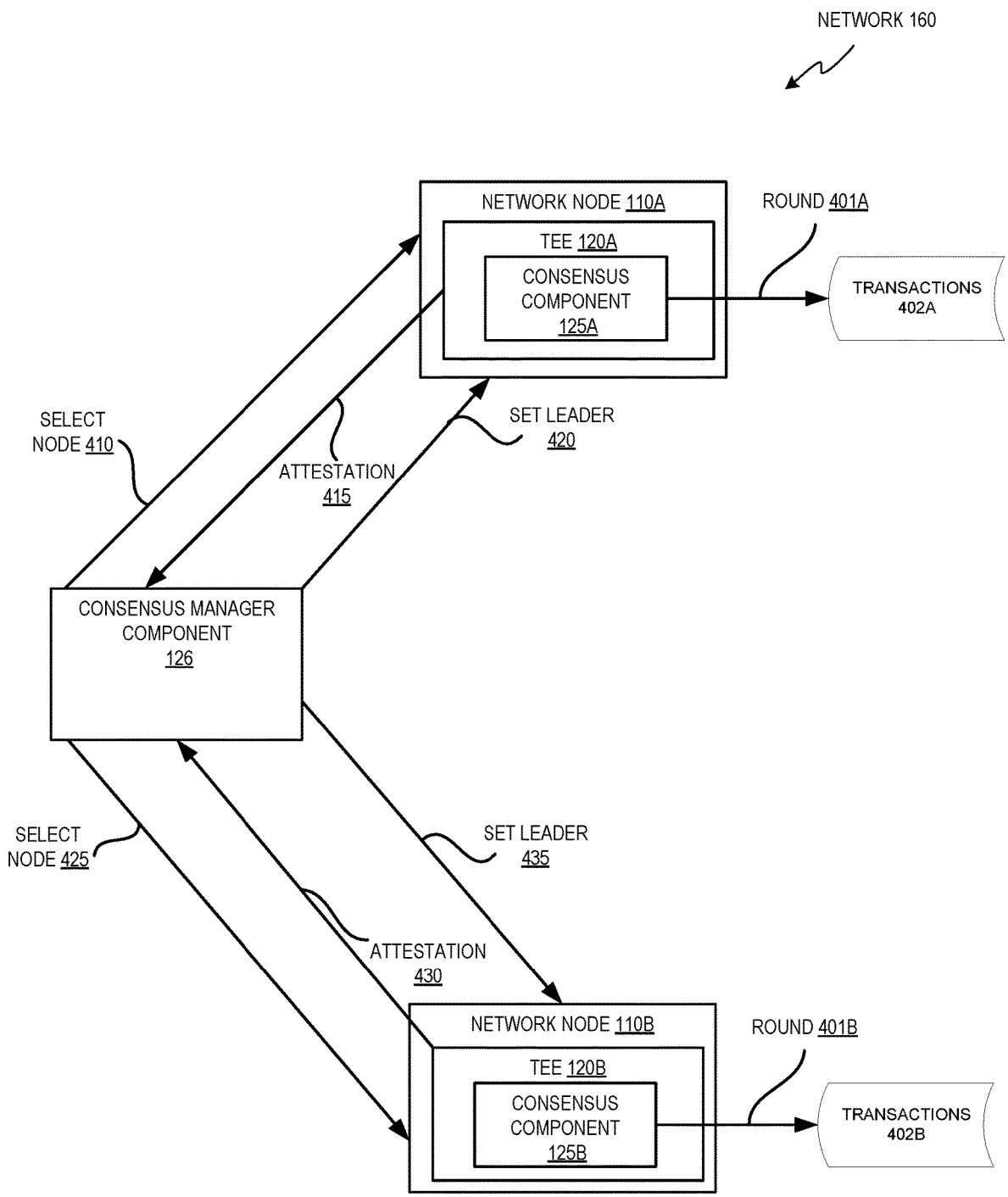
FIG. 4 depicts an illustration of a centralized consensus manager for facilitating network consensus management using trusted execution environments, in accordance with one or more aspects of the present disclosure

FIG. 4 depicts an illustration of a facilitating centralized networking consensus management using trusted execution environments. As shown in FIG. 4, a consensus manager component 126 can be loaded into and executed by a TEE for a network manager node for network 160 (e.g., the network manager node 110Z of FIG. 1). Consensus manager component 126 can identify other nodes communicating within network 160 and select one of the nodes as the consensus manager for the first round (e.g., round 401A) of network transactions. As described below with respect to FIG. 6, consensus manager component 126 can invoke the random number generator associated with the TEE executing consensus manager component 126 (e.g., TEE 120Z of FIG. 1) to make the selection.

As shown in FIG. 4, consensus manager component 126 selects node 110A ("select node 410"). Consensus manager component 126 can then authenticate the consensus component 125A executing in TEE 120A of node 110A by performing attestation operation 415. If the attestation operation 415 indicates that consensus component 125A is compatible with consensus manager component 126, network node 110A is set as the consensus leader for the first round (depicted by "set leader 420").

Consensus component 125A manages transactions 402A until the transactions 402A for round 401A satisfies A threshold (e.g., a threshold number of transactions, a threshold period of time, etc.). In some implementations, consensus component 125A can monitor the transactions 402A to make this determination and report to consensus manager component 126 that the threshold has been satisfied. Alternatively, consensus manager component 126 can make this determination.

Once this threshold has been satisfied for round 401A, consensus manager component 126 selects another node in network 160 to act as consensus leader for the next round of transactions (e.g., round 401B). Consensus manager component 126 can invoke the random number generator associated with the TEE executing consensus manager component 126 (e.g., TEE 120Z of FIG. 1) to make the selection. As shown, consensus manager component 126 selects node 110B (depicted by "select node 425"). Consensus manager component 126 can then authenticate the consensus component 125B executing in TEE 120B of node 110B by performing attestation operation 430. If the attestation operation 430 indicates that consensus component 125B is compatible with consensus manager component 126, network node 110B is set as the consensus leader for the next round (depicted by "set leader 435"). Consensus component 125A can then report out a summary of the transactions 402A in round 401A to nodes 110B. In some implementations, consensus component 125A can additionally report out the summary to the network manager node.

Consensus manager component 126 can then repeat the above process to select the consensus leader node for the next round of transactions. Note that for ease of illustration a particular order of node selection has been depicted with a particular number of rounds. In other implementations, aspects of the present disclosure can be applied to more or fewer nodes, using more or fewer rounds. Similarly, the order of node selection can be different than that depicted in FIG. 4.

Figure 5:
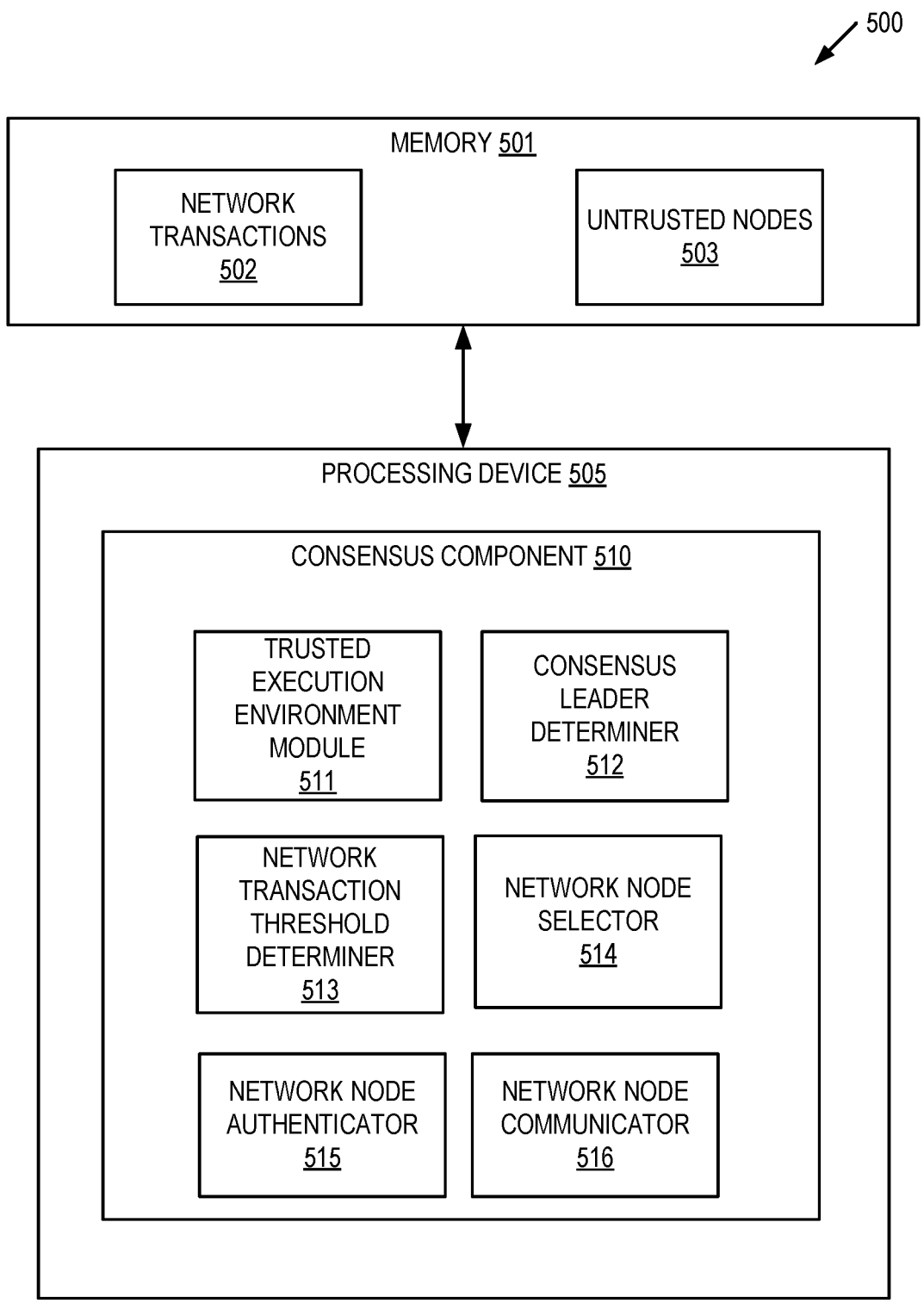
FIG. 5 depicts a block diagram illustrating an example of a consensus component that facilitates decentralized network consensus management using trusted execution environments, in accordance with one or more aspects of the present disclosure.

FIG. 5 depicts a block diagram illustrating an example of a consensus component 510 for facilitating decentralized network consensus management using trusted execution environments. In some implementations, consensus component 510 may correspond to consensus component 125A-C of FIG. 1. As shown in FIG. 5, consensus component 510 may be a component of a computing apparatus 500 that includes a processing device 505, operatively coupled to a memory 501, to execute consensus component 510. In some implementations, processing device 505 and memory 501 may correspond to processing device 902 and main memory 904 respectively as described below with respect to FIG. 9. In various implementations, computing apparatus 500 can be a standalone host computing device that communicates with various tenant computing devices. Alternatively, computing apparatus 500 can be a component of a cloud computing environment made up of multiple host computing devices, an Internet of Things (IoT) edge device, or the like. In various implementations, computing apparatus 500 can host multiple nodes, where each node can include a separate consensus component 510 dedicated to managing the networking traffic and consensus management for that particular node.

Consensus component 510 may include trusted execution environment module 511, consensus leader determiner 512, network transaction threshold determiner 513, network node selector 514, network node authenticator 515, and network node communicator 516. Alternatively, the functionality of one or more of trusted execution environment module 511, consensus leader determiner 512, network transaction threshold determiner 513, network node selector 514, network node authenticator 515, and network node communicator 516 may be combined into a single module or divided into multiple sub-modules.

Trusted execution environment module 511 is responsible for establishing a trusted execution environment (TEE) (e.g., a TEE instance) for a node of a network in a distributed computing system. In various implementations, trusted execution module 511 can be invoked immediately upon the first execution of the consensus component 510 (e.g., when the node is initialized and begins networking operations). In such instances, trusted execution environment module 511 can establish the TEE instance and configure it to execute the remaining components of consensus component 510. Trusted execution environment module 511 can subsequently load the executable code for the consensus component 510 into the established TEE instance and cause the TEE instance to execute the consensus component 510 (or some components of the consensus component 510) within the TEE instance.

Consensus leader determiner 512 is responsible for determining a "consensus leader" for a set of networking transactions processed by the nodes in the network. As noted above a consensus leader is the node that manages the contents and/or values of a set of transactions and the order in which the transactions occurred. In various implementations, a node that is assigned the role of consensus leader establishes the accepted values and order of a set (or "round") of transactions that are processed by the nodes in the network.

In some implementations, consensus leader determiner 512 can determine whether the node in which it is executing is the consensus leader. For example, if the node that is currently executing the consensus leader determiner 512 is the first node to communicate on the network, then it may be deemed the consensus leader (since no other nodes are present). In some implementations, consensus leader determiner 512 can make this determination by interacting with a particular communication port (e.g., "listening" or "pinging" the communication port) to determine if any other nodes are communicating on the network. If not, then consensus leader determiner 512 can determine that it is the consensus leader for the next round of networking transactions processed by the network. In such instances, consensus leader determiner 512 can additionally store a timestamp in the TEE instance to establish when that node joined the network. This can be used to compare against other nodes in the network to resolve any conflicts as to which node was first to join the network if no other node has been established as the consensus leader. If, however, there are other nodes on the network, consensus leader determiner 512 can receive information from one or more of the other nodes to determine whether another node has been deemed the consensus leader for the next round of transactions.

Network transaction threshold determiner 513 is responsible for determining that a round (or set) of transactions processed by the network satisfies a threshold. In various implementations, the threshold can be associated with a number of transactions, a period of time, or the like. For example, if the number of transactions processed reaches a particular threshold number, then transaction threshold determiner 513 can determine that the round has ended. Alternatively, if a particular period of time as elapsed since the round began, transaction threshold determiner 513 can determine that the round has ended. In either instance, the end of the round can indicate that the content and order of the transactions in the round should be communicated out to the other nodes in the network to establish consensus for that round, and subsequently a new consensus leader should be chosen for the next round.

In various implementations, the consensus component 510 of the consensus leader node for the round can store the processed networking transactions in memory 501 (e.g., networking transactions 502) that can be later used to establish consensus with the other nodes of the network. In some instances, network transactions 502 can be stored in an encrypted portion of memory associated with the TEE instance established by trusted execution environment module 511.

Network node selector 514 is responsible for selecting another node from the additional nodes of the network in the distributed computer system. Network node selector 514 can be invoked by network transaction threshold determiner 513 when the end of a round of transactions has been detected. In various implementations, network node selector 514 can identify one or more additional nodes in the network and select another node from the additional nodes randomly or pseudo-randomly using a random number generator. In some implementations, network node selector 514 can execute a hardware random generator component of the TEE instance to select one of the additional nodes in the network as the next consensus leader.

In some instances, network node selector 514 can additionally incorporate information associated with the other nodes in the network to make this selection. For example, network node selector 514 can take into account the consensus leader history for the network. In other words, network node selector 514 can exclude any node that has recently acted as the consensus leader to prevent that leader from being chosen as leader repetitively. In such instances, before randomly (or pseudo-randomly) selecting the next leader node, network node selector 514 can exclude the previously selected leader node. Similarly, network node selector 514 can exclude one or more of the most recently selected leader nodes in order to decrease the exposure and/or security risk of any particular node. In some implementations, network node selector 514 can additionally exclude other nodes based on a total number of times a node has been previously selected regardless of whether or not it has been selected recently. In other implementations, network node selector 514 can refer to a stored list of untrusted nodes (e.g., untrusted nodes 503) to exclude those nodes from consideration. Once a node has been selected as a potential candidate to be the next consensus leader, network node authenticator 515 can be invoked to authenticate the selected node.

Network node authenticator 515 is responsible for determining whether or not the node selected by network node selector 514 can take over as consensus leader for the next round of transactions. Network node authenticator 515 can make this determination by determining that the randomly (or pseudo-randomly) selected candidate node is executing a TEE instance that satisfies an authentication threshold. In various implementations, an authentication threshold can be associated with compatible versions of the consensus component to ensure that the selected candidate node is executing an authorized version of the component. In other words, if the candidate node is executing a TEE instance that includes an authorized or compatible version of the consensus component executable code, the candidate node satisfies the authentication threshold. If, however, the candidate node is not executing a TEE instance, or if the candidate node is executing a TEE instance that includes an unauthorized or outdated version of the consensus component executable code, the authentication threshold may not be met, and the candidate node may be designated as "untrusted". In such instances, identification information for the untrusted node may be stored in untrusted nodes 503 to restrict that node from being selected for one or more future rounds.

In various implementations, network node authenticator 515 can authenticate the candidate node by performing a remote attestation operation for the candidate node. In such instances, network node authenticator 515 can send an authentication request to the candidate node (e.g., a "challenge" request) and receive attestation data from the TEE instance of the candidate node. If the candidate node does not include a TEE instance to respond appropriately, the challenge should fail, indicating that the candidate node is untrusted and should not be the next consensus leader. If, however, the candidate node does include a TEE instance, the received attestation data from the TEE instance of the candidate node can include data associated with the consensus component that is executing in the TEE instance of the candidate node. In various implementations, this attestation data can be a hash value of the consensus component (e.g., a hash value descriptive of the consensus component or a hash value descriptive of a portion of the consensus component) executing in the TEE instance of the candidate node. Alternatively, the attestation data can include a digital signature associated with the consensus component, or a set of digital signatures associated with the consensus component. In implementations where the attestation data includes a set of digital signatures, attestation can be performed in view of a threshold scheme of signatures (e.g., where attestation can be performed responsive to receiving a threshold number of signatures).

Network node authenticator 515 can then determine whether the received attestation data indicates that the consensus component executed by the TEE instance of the candidate node is compatible with consensus component 510. In various implementations, network node authenticator 515 can make this determination by validating the hash value in the received attestation data in view of known valid has values associated with versions of the consensus component that are compatible with consensus component 510. For example, network node authenticator 515 can compare the received hash values with a collection of stored hash values associated with versions of the executable code that are compatible with consensus component 510. Compatible versions of the executable code can include the same version of the code that is executed by consensus component 510, a previous version of the executable code that is supported by the version executed by consensus component 510, a newer version of the executable code where one or more portions are backward compatible with the version executed by consensus component 510, or the like.

Responsive to determining that the candidate node includes a TEE instance that satisfies the authentication threshold (e.g., is executing a version of the consensus component that is compatible with consensus component 510), consensus leader determiner 512 can be invoked to set the TEE of the candidate node as the consensus leader for the next round of networking transactions processed by the network. If, however, network node authenticator 515 determines that the candidate node either does not include a TEE instance or includes a TEE instance that does not satisfy the authentication threshold, the candidate node can be added to the list of untrusted nodes and the above process can be repeated by invoking network node selector 514 to select a TEE from another node in the network to be the next consensus leader.

Network node communicator 516 is responsible for notifying the nodes in the network that the TEE of the newly selected node is the consensus leader for the next round of networking transactions processed by the network. In various implementations, network node communicator 516 can initially send a notification to the candidate node to notify the TEE of that node that it has been selected as the consensus leader for the next round of networking transactions. In some instances, network node communicator 516 can subsequently notify the remaining nodes responsive to receiving an acknowledgment from the TEE of the selected candidate node that it has accepted the leader designation. In other implementations, network node communicator 516 can send a broadcast message to all nodes in the network at the same time to indicate that the TEE of the candidate node has been selected as the new leader. The TEE of the candidate node can subsequently confirm with a broadcast message to all nodes indicating that it has assumed leadership for the next round of networking transactions.

Subsequently, network node communicator 516 can send a summary of the content and order of transactions in the currently processed transaction round to the other nodes in the network. Once that has been completed, consensus component 510 can terminate leadership management of transactions in the subsequent transaction round, acting as network participant rather than the consensus leader. Since the newly selected leader node has been authenticated as including the same or compatible code, it should repeat the above process to manage the transactions for the next round and select another node to be consensus leader for a subsequent round of network transactions.

Figure 6:
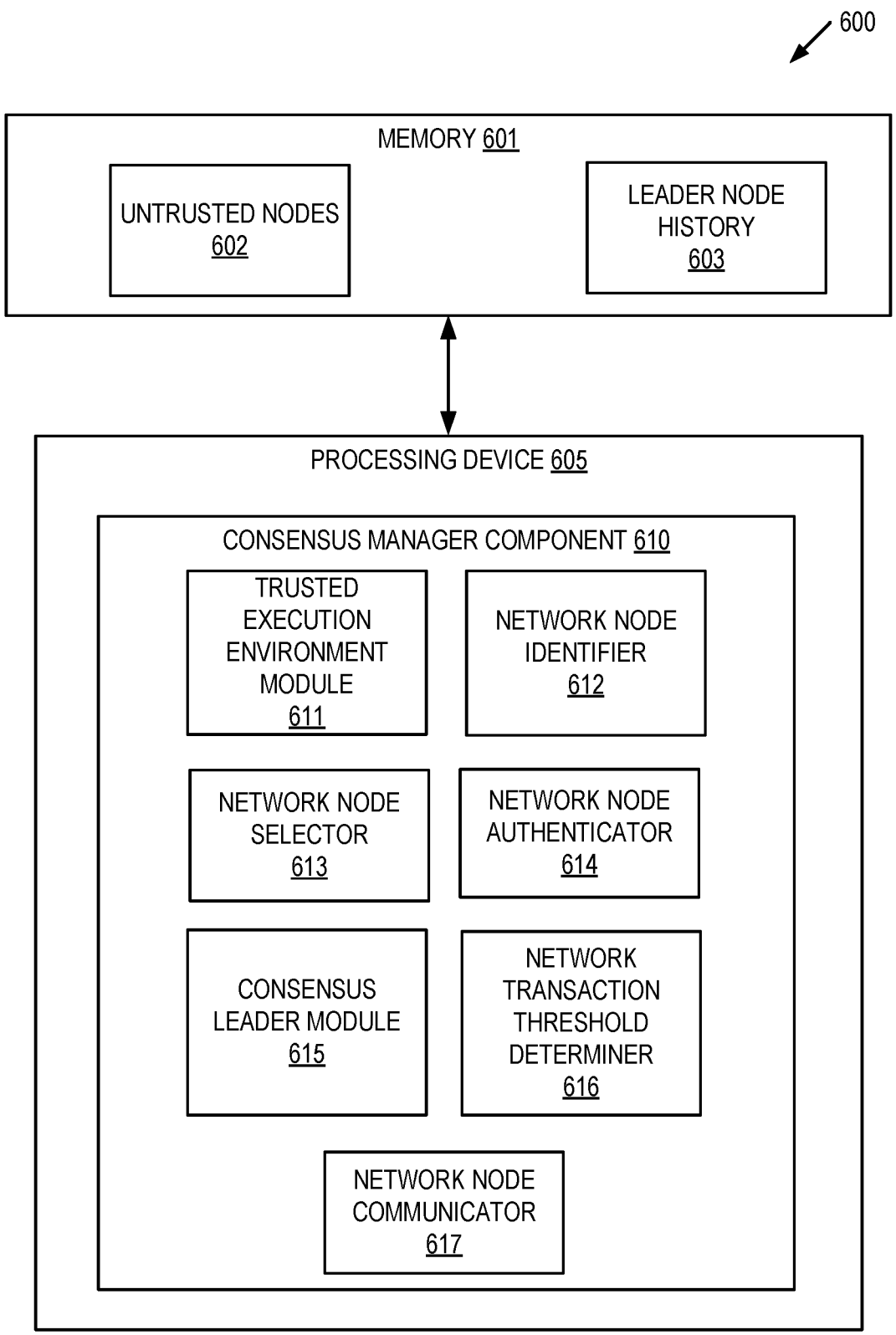
FIG. 6 depicts a block diagram illustrating an example of a consensus manager component that facilitates centralized network consensus management using trusted execution environments, in accordance with one or more aspects of the present disclosure.

FIG. 6 depicts a block diagram illustrating an example of a consensus manager component 610 for facilitating centralized network consensus management using trusted execution environments. In some implementations, consensus manager component 610 may correspond to consensus management component 126 of FIG. 1. As shown in FIG. 6, consensus component 610 may be a component of a computing apparatus 600 that includes a processing device 605, operatively coupled to a memory 601, to execute consensus component 610. In some implementations, processing device 605 and memory 601 may correspond to processing device 902 and main memory 904 respectively as described below with respect to FIG. 9. In various implementations, computing apparatus 600 can be a standalone host computing device that communicates with various tenant computing devices. Alternatively, computing apparatus 600 can be a component of a cloud computing environment made up of multiple host computing devices, an Internet of Things (IoT) edge device, or the like. In various implementations, computing apparatus 600 can host multiple nodes, where each node can include a separate consensus component (e.g., consensus component 510) dedicated to managing the networking transactions on that node as well as consensus summations for a transaction round should the TEE of that particular node be selected as a consensus leader by consensus manager component 610.

Consensus manager component 610 may include trusted execution environment module 611, network node identifier 612, network node selector 613, network node authenticator 614, consensus leader module 615, network transaction threshold determiner 616, and network node communicator 617. Alternatively, the functionality of one or more of trusted execution environment module 611, network node identifier 612, network node selector 613, network node authenticator 614, consensus leader module 615, network transaction threshold determiner 616, and network node communicator 617 may be combined into a single module or divided into multiple sub-modules.

Trusted execution environment module 611 is responsible for establishing a trusted execution environment (TEE) (e.g., a TEE instance) for a network manager node of a network in a distributed computing system. As noted above, a network manager node can act as a centralized arbiter for determining a TEE instance of a node in the network to perform the operations of consensus leader for a particular round of networking transactions. In various implementations, trusted execution module 611 can be invoked upon initial startup of the network manager node (e.g., when the node is initialized and begins networking management operations for the network). In such instances, trusted execution environment module 611 can establish the TEE instance and configure it to execute the remaining components of consensus manager component 610. Trusted execution environment module 611 can subsequently load the executable code for the consensus manager component 610 into the established TEE instance and cause the TEE instance to execute the consensus manager component 610 (or some components of the consensus component 610) within the TEE instance.

Network node identifier 612 is responsible for identifying on or more additional nodes of the network managed by the network manager node of apparatus 600. In some implementations, network node identifier 612 can make this determination by interacting with a particular communication port or range of communication ports (e.g., "listening" or "pinging" the communication port(s)) to determine if any other nodes are communicating on the network.

Network node selector 613 is responsible for selecting a TEE instance of one of the identified nodes of the network as a candidate to act as consensus leader for a round of networking transactions. In some instances, network node selector 613 can be invoked to select a network node with a TEE to act as the first consensus leader for network transactions. In these instances, network node selector 613 can be initiated when the network node manager is initiated. In other instances, network node selector 613 can be invoked by network transaction threshold determiner 615 to select a new consensus leader when the end of a round of transactions has been detected as described below. In various implementations, network node selector 613 can identify one or more nodes in the network and select a node randomly or pseudo-randomly using a random number generator. In some implementations, network node selector 613 can execute a hardware random generator component of the TEE instance to select a TEE for one of the additional nodes in the network as the next consensus leader.

In some instances, network node selector 613 can additionally incorporate information associated with the other nodes in the network to make this selection. For example, network node selector 613 can take into account the consensus leader history for the network. In other words, network node selector 613 can exclude any node whose TEE has recently acted as the consensus leader to prevent that leader from being chosen as leader repetitively. In such instances, before randomly (or pseudo-randomly) selecting the next leader node, network node selector 613 can exclude the previously selected leader node. Similarly, network node selector 613 can exclude one or more of the most recently selected leader nodes in order to decrease the exposure and/or security risk of any particular node. In some implementations, network node selector 613 can additionally exclude other nodes based on a total number of times a node has been previously selected regardless of whether or not it has been selected recently. In other implementations, network node selector 613 can refer to a stored list of untrusted nodes (e.g., untrusted nodes 602) to exclude those nodes from consideration. Once a node has been selected as a potential candidate to be the first (or next) consensus leader, network node authenticator 613 can be invoked to authenticate the selected node.

Network node authenticator 614 is responsible for determining whether or not the node selected by network node selector 613 can take act as consensus leader for the next round of networking transactions. Network node authenticator 614 can make this determination by determining that the randomly (or pseudo-randomly) selected candidate node is executing a TEE that satisfies an authentication threshold. In various implementations, an authentication threshold can be associated with compatible versions of the consensus component to ensure that the selected candidate node is executing an authorized version of the component. In other words, if the candidate node is executing a TEE that includes an authorized or compatible version of the consensus component executable code, the candidate node satisfies the authentication threshold. If, however, the candidate node is not executing a TEE, or if the candidate node is executing a TEE that includes an unauthorized or outdated version of the consensus component executable code, the authentication threshold may not be met, and the candidate node may be designated as "untrusted". In such instances, identification information for the untrusted node may be stored in untrusted nodes 602 to restrict that node from being selected for one or more future rounds.

In various implementations, network node authenticator 614 can authenticate the candidate node by performing a remote attestation operation for the candidate node. In such instances, network node authenticator 614 can send an authentication request to the candidate node (e.g., a "challenge" request) and receive attestation data from the TEE of the candidate node. If the candidate node does not include a TEE to respond appropriately, the challenge should fail, indicating that the candidate node is untrusted and should not be the next consensus leader. If, however, the candidate node does include a TEE, the received attestation data from the TEE of the candidate node can include data associated with the consensus component that is executing in the TEE of the candidate node. In various implementations, this attestation data can be a hash value of the consensus component (or a hash value of a portion of the consensus component) executing in the TEE of the candidate node.

Network node authenticator 614 can then determine whether the received attestation data indicates that the consensus component executed by the TEE of the candidate node is compatible with consensus manager component 610. In various implementations, network node authenticator 614 can make this determination by validating the hash value in the received attestation data in view of known valid has values associated with versions of the consensus component that are compatible with consensus manager component 610. For example, network node authenticator 614 can compare the received hash values with a collection of stored hash values associated with versions of the executable code that are compatible with consensus manager component 610. Compatible versions of the executable code can include the same version of the code that is executed by consensus manager component 610, a previous version of the executable code that is supported by the version executed by consensus component 610, a newer version of the executable code where one or more portions are backward compatible with the version executed by consensus manager component 610, or the like.

Responsive to determining that the candidate node includes a TEE instance that satisfies the authentication threshold (e.g., is executing a version of the consensus component that is compatible with consensus manager component 610), consensus leader module 616 can be invoked to set the TEE instance of the candidate node as the consensus leader for the next round of networking transactions processed by the network. If, however, network node authenticator 614 determines that the candidate node either does not include a TEE or includes a TEE instance that does not satisfy the authentication threshold, the candidate node can be added to the list of untrusted nodes and the above process can be repeated by invoking network node selector 613 to select another node in the network to be the next consensus leader.

Consensus leader module 615 is responsible for setting the TEE instance of the selected candidate node as the consensus leader for the subsequent round of networking transactions. In various implementations, consensus leader module 615 can store information in memory 601 that maintains the history of the selected leader nodes (e.g., leader node history 603) so that it can be used for the selection of consensus leader nodes for subsequent rounds of networking transactions.

Network node communicator 617 is responsible for notifying the nodes in the network that the TEE instance of the newly selected node is the consensus leader for the next round of networking transactions processed by the network. In various implementations, network node communicator 617 can initially send a notification to the candidate node to notify that node that its TEE instance has been selected as the consensus leader for the next round of networking transactions. In some instances, network node communicator 617 can subsequently notify the remaining nodes responsive to receiving an acknowledgment from the selected candidate node that it has accepted the leader designation. In other implementations, network node communicator 617 can send a broadcast message to all nodes in the network at the same time to indicate that the candidate node has been selected as the new leader. The candidate node can subsequently confirm with a broadcast message to all nodes indicating that it has assumed leadership for the next round of networking transactions.

Subsequently, network node communicator 617 can send a summary of the content and order of transactions in the currently processed transaction round to the other nodes in the network. Once that has been completed, consensus manager component 610 can monitor networking transactions until a round has been completed. In some implementations, consensus manager component 610 can invoke network transaction threshold determiner 616 for this purpose. Alternatively, the TEE instance of the new consensus leader node can monitor the networking activity to determine the when the round has been completed. In such instances, the TEE instance of the leader node can send a request to consensus manager component 610 to select a new consensus leader node. The above process can then be repeated to select a new leader node for the next round of transactions.

Network transaction threshold determiner 616 is responsible for determining that a round (or set) of transactions processed by the network satisfies a threshold. In various implementations, the threshold can be associated with a number of transactions, a period of time, or the like. For example, if the number of transactions processed reaches a particular threshold number, then transaction threshold determiner 616 can determine that the round has ended. Alternatively, if a particular period of time as elapsed since the round began, transaction threshold determiner 616 can determine that the round has ended. In either instance, the end of the round can indicate that the content and order of the transactions in the round should be communicated out to the other nodes in the network to establish consensus for that round, and subsequently a new consensus leader should be chosen for the next round.

Figure 7:
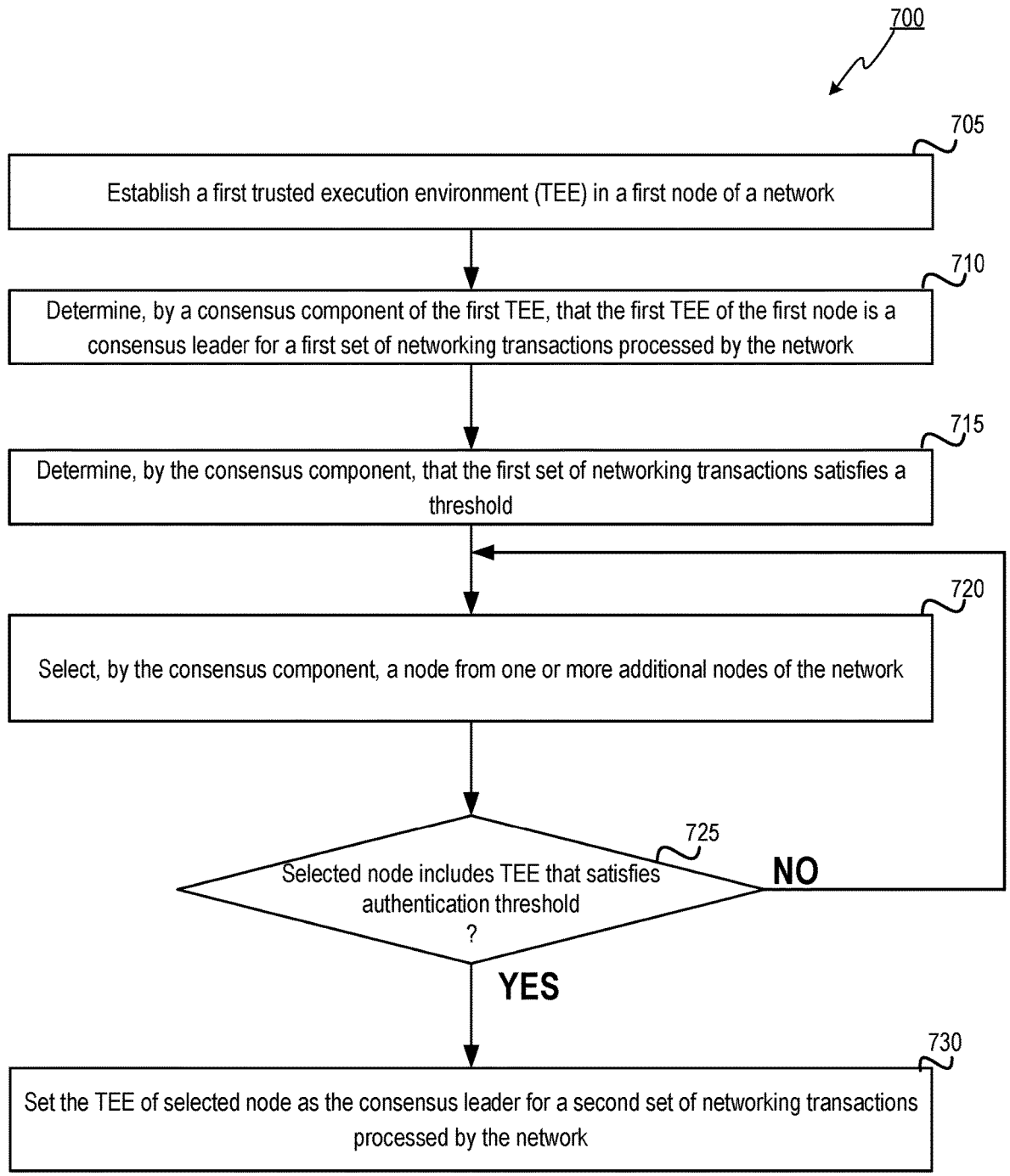
FIG. 7 depicts a flow diagram of a method for facilitating decentralized network consensus management using trusted execution environments, in accordance with one or more aspects of the present disclosure.

FIG. 7 depicts a flow diagram of an example method 700 for facilitating decentralized network consensus management using trusted execution environments. The method may be performed by processing logic that may comprise hardware (circuitry, dedicated logic, etc.), computer readable instructions (run on a general purpose computer system or a dedicated machine), or a combination of both. In an illustrative example, method 700 may be performed by consensus component 125A-B in FIG. 1 or consensus component 510 in FIG. 5. Alternatively, some or all of method 700 might be performed by another module or machine. It should be noted that blocks depicted in FIG. 7 could be performed simultaneously or in a different order than that depicted.

At block 705, processing logic establishes a first trusted execution environment (TEE) (e.g., a TEE instance) for a first node of a network in a distributed computing system, wherein the first TEE comprises an executable consensus component. At block 710, processing logic determines, by the consensus component, that the TEE of the first node is a consensus leader for a first set of networking transactions processed by the network in the distributed computing system. In some implementations, processing logic can make this determination by determining that no other nodes are communicating on the network.

At block 715, processing logic determines, by the consensus component, that the first set of networking transactions satisfies a threshold. At block 720, processing logic selects, by the consensus component, a second node from one or more additional nodes of the network in the distributed computing system. In various implementations, this determination can be performed by randomly (or pseudo-randomly) selecting another node from the network using a random number generator. For example, processing logic can execute a hardware random number generator accessible to the TEE to make this determination. At block 725, processing logic determines whether the second node comprises a second TEE that satisfies an authentication threshold. If so, processing continues to block 703. Otherwise, processing returns to block 720 to select a different node within the network. At block 730, processing logic sets, by the consensus component, the TEE of the second node as the consensus leader for a second set of networking transactions processed by the network in the distributed computing system.

Figure 8:
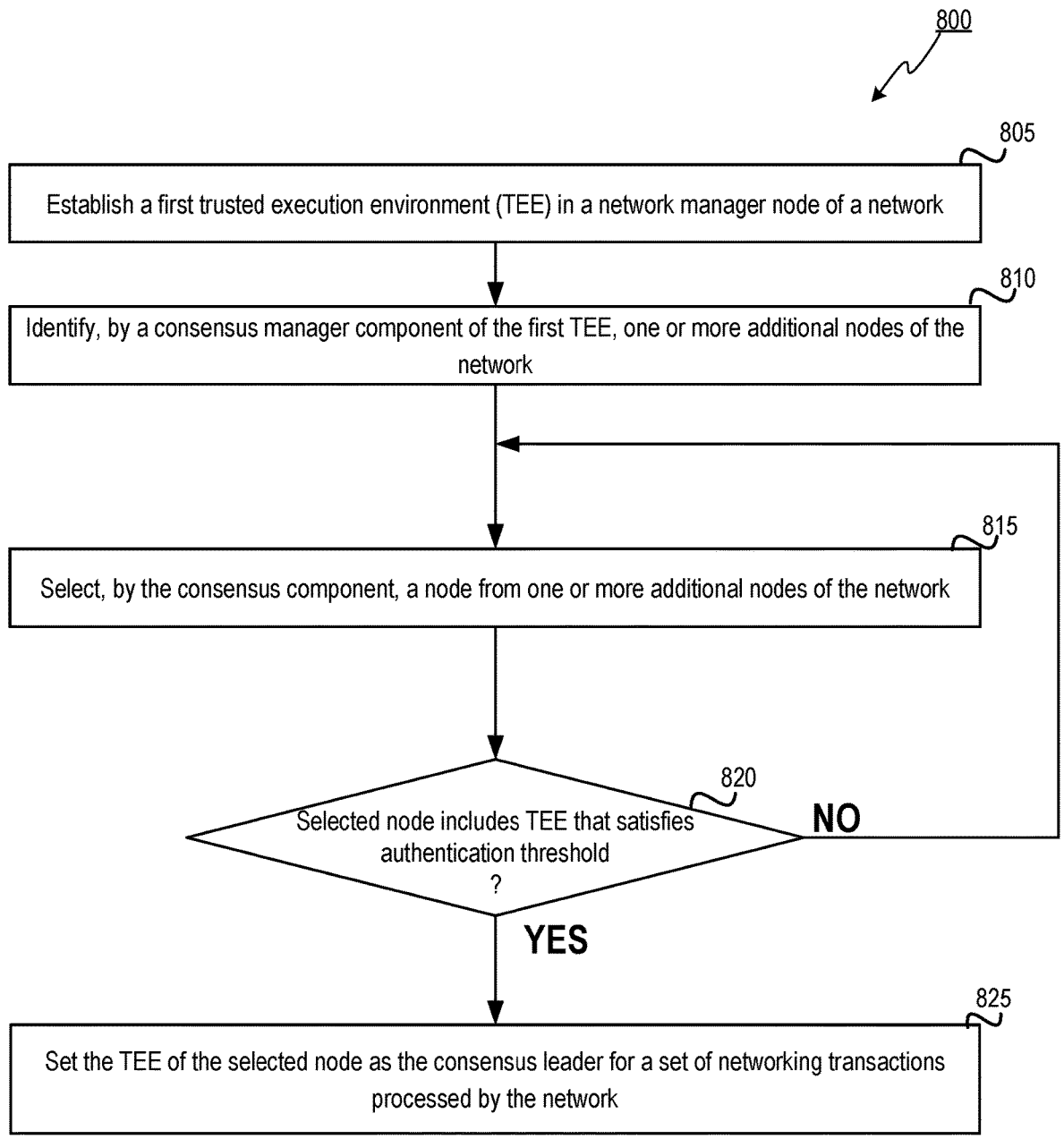
FIG. 8 depicts a flow diagram of a method for facilitating centralized network consensus management using trusted execution environments, in accordance with one or more aspects of the present disclosure.

FIG. 8 depicts a flow diagram of an example method 800 for facilitating centralized network consensus management using trusted execution environments. The method may be performed by processing logic that may comprise hardware (circuitry, dedicated logic, etc.), computer readable instructions (run on a general purpose computer system or a dedicated machine), or a combination of both. In an illustrative example, method 800 may be performed by consensus manager component 126 in FIG. 1 or consensus manager component 610 in FIG. 6. Alternatively, some or all of method 800 might be performed by another module or machine. It should be noted that blocks depicted in FIG. 8 could be performed simultaneously or in a different order than that depicted.

At block 805, processing logic establishes a first trusted execution environment (TEE) (e.g., a TEE instance) for a network manager node of a network in a distributed computing system, where the first TEE comprises consensus manager component. At block 810, processing logic identifies, by the consensus manager component, one or more additional nodes of the network in the distributed computer system.

At block 815, processing logic selects, by the consensus manager component, a first node from one or more additional nodes of the network in the distributed computing system. In various implementations, this determination can be performed by randomly (or pseudo-randomly) selecting another node from the network using a random number generator. For example, processing logic can execute a hardware random number generator accessible to the TEE to make this determination.

At block 820, processing logic determines, by the consensus manager component, whether the first node comprises a second TEE that satisfies an authentication threshold. If so, processing continues to block 825. Otherwise, processing returns to block 815 to select a different node within the network. At block 825, processing logic sets, by the consensus component, the TEE of the first node as a consensus leader for a first set of networking transactions processed by the network in the distributed computing system.

Figure 9:
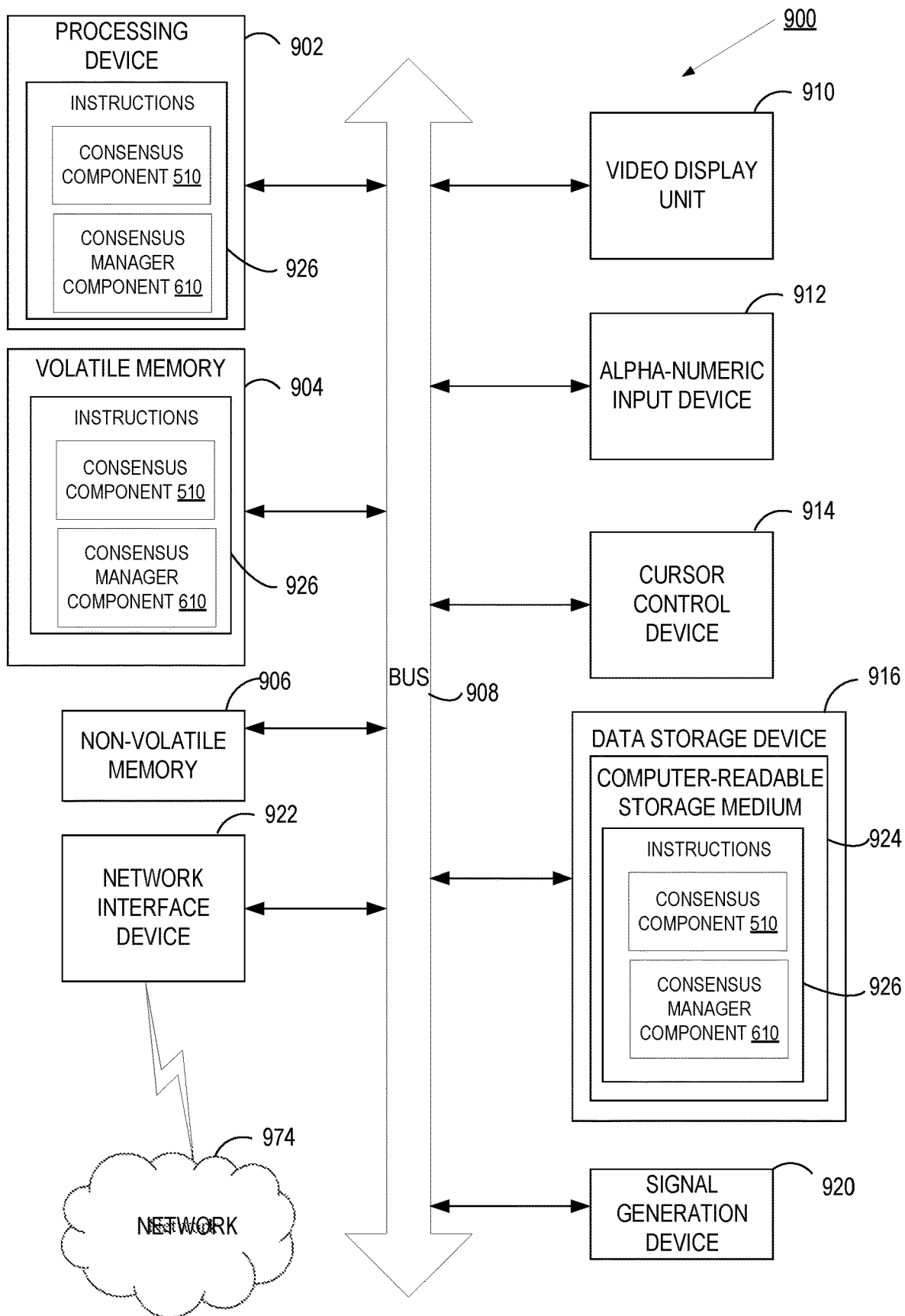
FIG. 9 depicts a block diagram of an illustrative computer system operating in accordance with one or more aspects of the present disclosure.

FIG. 9 depicts a block diagram of a computer system operating in accordance with one or more aspects of the present disclosure. In various illustrative examples, computer system 900 may correspond to computing devices associated with nodes 110A-Z of FIG. 1, apparatus 500 of FIG. 5, and/or apparatus 600 of FIG. 6. Computer system 900 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alphanumeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions for implementing methods 700 and 800, and for encoding components 510 and 610.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "establishing," "determining," "selecting," "setting," "loading," "causing," "executing," "identifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements (e.g., cardinal meaning) and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 700 and 800 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

Other computer system designs and configurations may also be suitable to implement the systems and methods described herein. The following examples illustrate various implementations in accordance with one or more aspects of the present disclosure.

Example 1 is a method comprising: determining, by a communication component of a first trusted execution environment (TEE) established for a first node of a network in a distributed computing system, that the first TEE of the first node is a leader for a first set of networking transactions processed by the network in the distributed computing system; determining, by the communication component, that the first set of networking transactions satisfies a transaction threshold; selecting, by the communication component, a second node from one or more additional nodes of the network in the distributed computing system; determining, by the communication component, whether the second node comprises a second TEE that satisfies an authentication threshold; and responsive to determining that the second node comprises the second TEE that satisfies the authentication threshold, setting, by the communication component, the second TEE of the second node as the leader for a second set of networking transactions processed by the network in the distributed computing system.

Example 2 is the method of Example 1, wherein the communication component is loaded into the first TEE for execution in the first TEE, the method further comprising: determining, by the communication component; whether any additional nodes are communicating within the distributed computing environment; and responsive to determining that no additional nodes are communicating within the distributed computing system, setting, by the communication component, the first TEE of the first node as the leader for the network.

Example 3 is the method of Example 1, wherein determining whether the second node comprises a second TEE that satisfies the authentication threshold comprises: sending an authentication request to the second node; receiving attestation data from the second TEE of the second node, wherein the attestation data is associated with a second communication component executed by the second TEE; determining whether the attestation data indicates that the second communication component executed by the second TEE is compatible with the communication component executed by the first TEE; and responsive to determining that the attestation data indicates that the second communication component is compatible with the communication component executed by the first TEE, determining that the second TEE satisfies the authentication threshold.

Example 4 is the method of Example 3, wherein the attestation data comprises a hash value associated with the second communication component, the method further comprising: validating the hash value associated with the second communication component in view of known valid hash values associated with compatible versions of the communication component executed by the first TEE.

Example 5 is the method of Example 1, wherein selecting the second node from one or more additional nodes of the network in the distributed computing system comprises: identifying the one or more additional nodes of the network; and executing a hardware random number generator component associated with the first TEE to select the second node from the one or more additional nodes of the network.

Example 6 is the method of Example 1, further comprising: notifying the one or more additional nodes of the network that the second TEE of the second node is the leader for the second set of networking transactions.

Example 7 is the method of Example 1, further comprising: responsive to determining that the second node comprises a second TEE that does not satisfy the authentication threshold: selecting, by the communication component, a third node from one or more additional nodes of the network in the distributed computing system; determining, by the communication component, whether the third node comprises a third TEE that satisfies the authentication threshold; and responsive to determining that the third node comprises a third TEE that satisfies the authentication threshold, setting, by the communication component, the third TEE of the third node as the leader for the second set of networking transactions processed by the network in the distributed computing system.

Example 8 is the method of Example 7, further comprising: determining that the second node is an untrustworthy node for the network; and notifying the one or more additional nodes of the network that the second node is an untrustworthy node for the network.

Example 9 is a system comprising: a memory; and a processing device operatively coupled to the memory, the processing device to: determine, by a communication component of a first trusted execution environment (TEE) established for a first node of a network in a distributed computing system, that the first TEE of the first node is a leader for a first set of networking transactions processed by the network in the distributed computing system; determine, by the communication component, that the first set of networking transactions satisfies a threshold; select, by the communication component, a second node from one or more additional nodes of the network in the distributed computing system; determine, by the communication component, whether the second node comprises a second TEE that satisfies an authentication threshold; and responsive to determining that the second node comprises a second TEE that satisfies the authentication threshold, set, by the communication component, the second TEE of the second node as the leader for a second set of networking transactions processed by the network in the distributed computing system.

Example 10 is the system of Example 9, wherein the communication component is loaded into the first TEE for execution in the first TEE, and wherein the processing device is further to: determine, by the communication component; whether any additional nodes are communicating within the distributed computing environment; and responsive to determining that no additional nodes are communicating within the distributed computing system, set, by the communication component, the first TEE of the first node as the leader for the network.

Example 11 is the system of Example 9, wherein to determine whether the second node comprises a second TEE that satisfies the authentication threshold, the processing device is to: send an authentication request to the second node; receive attestation data from the second TEE of the second node, wherein the attestation data is associated with a second communication component executed by the second TEE; determine whether the attestation data indicates that the second communication component executed by the second TEE is compatible with the communication component executed by the first TEE; and responsive to determining that the attestation data indicates that the second communication component is compatible with the communication component executed by the first TEE, determine that the second TEE satisfies the authentication threshold.

Example 12 is the system of Example 9, wherein the attestation data comprises a hash value associated with the second communication component, and wherein the processing device is to further to: validate the hash value associated with the second communication component in view of known valid hash values associated with compatible versions of the communication component executed by the first TEE.

Example 13 is the system of Example 9, wherein to select the second node from one or more additional nodes of the network in the distributed computing system, the processing device is to: identify the one or more additional nodes of the network; and execute a hardware random number generator component associated with the first TEE to select the second node from the one or more additional nodes of the network.

Example 14 is the system of Example 9, wherein the processing device is further to: notify the one or more additional nodes of the network that the second TEE of the second node is the communication leader for the second set of networking transactions.

Example 15 is the system of Example 9, wherein the processing device is further to: responsive to determining that the second node comprises a second TEE that does not satisfy the authentication threshold: select, by the communication component, a third node from one or more additional nodes of the network in the distributed computing system; determine, by the communication component, whether the third node comprises a third TEE that satisfies the authentication threshold; and responsive to determining that the third node comprises a third TEE that satisfies the authentication threshold, set, by the communication component, the third TEE of the third node as the leader for the second set of networking transactions processed by the network in the distributed computing system.

Example 16 is the system of Example 15, wherein the processing device is further to: determine that the second node is an untrustworthy node for the network; and notify the one or more additional nodes of the network that the second node is an untrustworthy node for the network.

Example 17 is a non-transitory computer readable medium storing instructions which, when executed by a processing device, cause the processing device to: determine, by a communication component of a trusted execution environment (TEE) established for a first node of a network in a distributed computing system, that the first TEE of the first node is a leader for a first set of networking transactions processed by the network in the distributed computing system; determine, by the communication component, that the first set of networking transactions satisfies a transaction threshold; select, by the communication component, a second node from one or more additional nodes of the network in the distributed computing system; determine, by the communication component, whether the second node comprises a second TEE that satisfies an authentication threshold; and responsive to determining that the second node comprises a second TEE that satisfies the authentication threshold, set, by the communication component, the second TEE of the second node as the leader for a second set of networking transactions processed by the network in the distributed computing system.

Example 18 is the non-transitory computer readable medium of Example 17, wherein the communication component is loaded into the first TEE for execution in the first TEE, and wherein the processing device is further to: determine, by the communication component; whether any additional nodes are communicating within the distributed computing system; and responsive to determining that no additional nodes are communicating within the distributed computing system, set, by the communication component, the first TEE of the first node as the leader for the network.

Example 19 is the non-transitory computer readable medium of Example 17, wherein to determine whether the second node comprises a second TEE that satisfies the authentication threshold, the processing device is to: send an authentication request to the second node; receive attestation data from the second TEE of the second node, wherein the attestation data is associated with a second communication component executed by the second TEE; determine whether the attestation data indicates that the second communication component executed by the second TEE is compatible with the communication component executed by the first TEE; and responsive to determining that the attestation data indicates that the second communication component is compatible with the communication component executed by the first TEE, determine that the second TEE satisfies the authentication threshold.

Example 20 is the non-transitory computer readable medium of Example 17, wherein the processing device is further to: responsive to determining that the second node comprises a second TEE that does not satisfy the authentication threshold: select, by the communication component, a third node from one or more additional nodes of the network in the distributed computing system; determine, by the communication component, whether the third node comprises a third TEE that satisfies the authentication threshold; and responsive to determining that the third node comprises a third TEE that satisfies the authentication threshold, set, by the communication component, the third TEE of the third node as the leader for the second set of networking transactions processed by the network in the distributed computing system.

Example 21 is a method comprising: identifying, by a communication manager component of a first trusted execution environment (TEE) established for a network manager node of a network in a distributed computing system, one or more additional nodes of the network in the distributed computer system; selecting, by the communication manager component, a first node from one or more additional nodes of the network in the distributed computing system; determining, by the communication manager component, whether the first node comprises a second TEE that satisfies an authentication threshold; and responsive to determining that the first node comprises a second TEE that satisfies the authentication threshold, setting, by the communication component, the second TEE of the first node as a leader for a first set of networking transactions processed by the network in the distributed computing system.

Example 22 is the method of Example 21, wherein determining whether the first node comprises a second TEE that satisfies the authentication threshold comprises: sending an authentication request to the first node; receiving attestation data from the second TEE of the first node, wherein the attestation data is associated with a first communication component executed by the second TEE; determining whether the attestation data indicates that the first communication component executed by the second TEE is compatible with the communication manager component executed by the first TEE; and responsive to determining that the attestation data indicates that the first communication component is compatible with the communication manager component executed by the first TEE, determining that the second TEE satisfies the authentication threshold.

Example 23 is the method of Example 22, wherein the attestation data comprises a hash value associated with the first communication component, the method further comprising: validating the hash value associated with the second communication component in view of known valid hash values associated with compatible versions of the communication manager component executed by the first TEE.

Example 24 is the method of Example 21, wherein selecting the first node from one or more additional nodes of the network in the distributed computing system comprises: executing a hardware random number generator component associated with the first TEE to select the first node from the one or more additional nodes of the network.

Example 25 is the method of Example 21, further comprising: determining, by the communication manager component, that the first set of networking transactions satisfies a threshold; selecting, by the communication manager component, a second node from one or more additional nodes of the network in the distributed computing system; determining, by the communication manager component, whether the second node comprises a third TEE that satisfies an authentication threshold; and responsive to determining that the second node comprises a third TEE that satisfies the authentication threshold, setting, by the consensus component, the second TEE of the second node as the leader for a second set of networking transactions processed by the network in the distributed computing system.

Example 26 is the method of Example 21, further comprising: responsive to determining that the first node comprises a second TEE that does not satisfy the authentication threshold: selecting, by the communication manager component, a second node from one or more additional nodes of the network in the distributed computing system; determining, by the communication manager component, whether the second node comprises a third TEE that satisfies the authentication threshold; and responsive to determining that the second node comprises a third TEE that satisfies the authentication threshold, setting, by the communication component, the third TEE of the second node as the leader for the first set of networking transactions processed by the network in the distributed computing system.

Example 27 is the method of Example 26, further comprising: determining that the first node as an untrustworthy node for the network; and notifying the one or more additional nodes of the network that the first node is an untrustworthy node for the network.

Example 28 is a system comprising: a memory; and a processing device operatively coupled to the memory, the processing device to: identify, by a communication manager component of a trusted execution environment (TEE) established for a network manager node of a network in a distributed computing system, one or more additional nodes of the network in the distributed computer system; select, by the communication manager component, a first node from one or more additional nodes of the network in the distributed computing system; determine, by the communication manager component, whether the first node comprises a second TEE that satisfies an authentication threshold; and responsive to determining that the first node comprises a second TEE that satisfies the authentication threshold, set, by the communication component, the second TEE of the first node as a leader for a first set of networking transactions processed by the network in the distributed computing system.

Example 29 is the system of Example 28, wherein to determine whether the first node comprises a second TEE that satisfies the authentication threshold, the processing device is further to: send an authentication request to the first node; receive attestation data from the second TEE of the first node, wherein the attestation data is associated with a first communication component executed by the second TEE; determine whether the attestation data indicates that the first communication component executed by the second TEE is compatible with the communication manager component executed by the first TEE; and responsive to determining that the attestation data indicates that the first communication component is compatible with the communication manager component executed by the first TEE, determine that the second TEE satisfies the authentication threshold.

Example 30 is the system of Example 29, wherein the attestation data comprises a hash value associated with the first communication component, and wherein the processing device is further to: validate the hash value associated with the second communication component in view of known valid hash values associated with compatible versions of the communication manager component executed by the first TEE.

Example 31 is the system of Example 28, wherein to select the first node from one or more additional nodes of the network in the distributed computing system the processing device is further to: execute a hardware random number generator component associated with the first TEE to select the first node from the one or more additional nodes of the network.

Example 32 is the system of Example 28, wherein the processing device is further to: determine, by the communication manager component, that the first set of networking transactions satisfies a threshold; select, by the communication manager component, a second node from one or more additional nodes of the network in the distributed computing system; determine, by the communication manager component, whether the second node comprises a third TEE that satisfies an authentication threshold; and responsive to determining that the second node comprises a third TEE that satisfies the authentication threshold, set, by the communication component, the third TEE of the second node as the leader for a second set of networking transactions processed by the network in the distributed computing system.

Example 33 is the system of Example 28, wherein the processing device is further to: responsive to determining that the first node comprises a second TEE that does not satisfy the authentication threshold: select, by the communication manager component, a second node from one or more additional nodes of the network in the distributed computing system; determine, by the communication manager component, whether the second node comprises a third TEE that satisfies the authentication threshold; and responsive to determining that the second node comprises a third TEE that satisfies the authentication threshold, set, by the consensus component, the third TEE of the second node as the leader for the first set of networking transactions processed by the network in the distributed computing system.

Example 34 is a non-transitory computer readable medium storing instructions which, when executed by a processing device, cause the processing device to: identify, by a communication manager component of a trusted execution environment (TEE) established for a network manager node of a network in a distributed computing system, one or more additional nodes of the network in the distributed computer system; select, by the communication manager component, a first node from one or more additional nodes of the network in the distributed computing system; determine, by the communication manager component, whether the first node comprises a second TEE that satisfies an authentication threshold; and responsive to determining that the first node comprises a second TEE that satisfies the authentication threshold, set, by the communication component, the second TEE of the first node as a leader for a first set of networking transactions processed by the network in the distributed computing system.

Example 35 is the non-transitory computer readable medium of Example 34, wherein to determine whether the first node comprises a second TEE that satisfies the authentication threshold the processing device is further to: send an authentication request to the first node; receive attestation data from the second TEE of the first node, wherein the attestation data is associated with a first communication component executed by the second TEE; determine whether the attestation data indicates that the first communication component executed by the second TEE is compatible with the communication manager component executed by the first TEE; and responsive to determining that the attestation data indicates that the first communication component is compatible with the communication manager component executed by the first TEE, determine that the second TEE satisfies the authentication threshold.

Example 36 is the non-transitory computer readable medium of Example 34, wherein the attestation data comprises a hash value associated with the first communication component, and wherein the processing device is further to: validate the hash value associated with the second communication component in view of known valid hash values associated with compatible versions of the communication manager component executed by the first TEE.

Example 37 is the non-transitory computer readable medium of Example 34, wherein to select the first node from one or more additional nodes of the network in the distributed computing system the processing device is further to: execute a hardware random number generator component associated with the first TEE to select the first node from the one or more additional nodes of the network.

Example 38 is the non-transitory computer readable medium of Example 34, wherein the processing device is further to: determine, by the communication manager component, that the first set of networking transactions satisfies a threshold; select, by the communication manager component, a second node from one or more additional nodes of the network in the distributed computing system; determine, by the communication manager component, whether the second node comprises a third TEE that satisfies an authentication threshold; and responsive to determining that the second node comprises a third TEE that satisfies the authentication threshold, set, by the communication component, the third TEE of the second node as the leader for a second set of networking transactions processed by the network in the distributed computing system.

Example 39 is an apparatus comprising: means for determining, by a communication component of a first trusted execution environment (TEE) established for a first node of a network in a distributed computing system, that the first TEE of the first node is a leader for a first set of networking transactions processed by the network in the distributed computing system; means for determining, by the communication component, that the first set of networking transactions satisfies a transaction threshold; means for selecting, by the communication component, a second node from one or more additional nodes of the network in the distributed computing system; means for determining, by the communication component, whether the second node comprises a second TEE that satisfies an authentication threshold; and means for responsive to determining that the second node comprises a second TEE that satisfies the authentication threshold, setting, by the communication component, the second TEE of the second node as the leader for a second set of networking transactions processed by the network in the distributed computing system.

What is claimed is:

1. A method comprising:
   determining, using a processing device associated with a first trusted execution environment (TEE) established for a first node of a network in a distributed computing system, that the first TEE of the first node is a leader for a first set of networking transactions processed by the network in the distributed computing system;
   determining, using the processing device associated with the first TEE, whether a second node of the network in the distributed computing system comprises a second TEE that satisfies an authentication threshold; and
   responsive to determining that the second node comprises the second TEE that satisfies the authentication threshold, setting, using the processing device associated with the first TEE, the second TEE of the second node as the leader for a second set of networking transactions processed by the network in the distributed computing system.

2. The method of claim 1, further comprising:
   determining whether any additional nodes are communicating within the distributed computing environment; and
   responsive to determining that no additional nodes are communicating within the distributed computing system, setting the first TEE of the first node as the leader for the network.

3. The method of claim 1, wherein determining whether the second node comprises the second TEE that satisfies the authentication threshold comprises:
   sending an authentication request to the second node;
   receiving attestation data from the second TEE of the second node, wherein the attestation data is associated with a communication component executed by the second TEE;
   determining whether the attestation data indicates that the communication component executed by the second TEE is compatible with a communication component executed by the first TEE; and
   responsive to determining that the attestation data indicates that the communication component executed by the second TEE is compatible with the communication component executed by the first TEE, determining that the second TEE satisfies the authentication threshold.

4. The method of claim 3, wherein the attestation data comprises a hash value associated with the communication component executed by the second TEE, the method further comprising:
   validating the hash value associated with the communication component executed by the second TEE in view of known valid hash values associated with compatible versions of the communication component executed by the first TEE.

5. The method of claim 1, further comprising:
selecting the second node from one or more additional nodes of the network in the distributed computing system, wherein the selecting comprises:
identifying the one or more additional nodes of the network; and
executing a hardware random number generator component associated with the first TEE to select the second node from the one or more additional nodes of the network.

6. The method of claim 5, further comprising:
notifying the one or more additional nodes of the network that the second TEE of the second node is the leader for the second set of networking transactions.

7. The method of claim 1, further comprising:
responsive to determining that the second node comprises a second TEE that does not satisfy the authentication threshold:
selecting a third node from one or more additional nodes of the network in the distributed computing system;
determining whether the third node comprises a third TEE that satisfies the authentication threshold; and
responsive to determining that the third node comprises a third TEE that satisfies the authentication threshold, setting the third TEE of the third node as the leader for the second set of networking transactions processed by the network in the distributed computing system.

8. The method of claim 7, further comprising:
determining that the second node is an untrustworthy node for the network; and
notifying one or more additional nodes of the network that the second node is an untrustworthy node for the network.

9. A non-transitory computer readable medium storing instructions which, when executed by a processing device, cause the processing device to:
identify, using a communication manager component of a first trusted execution environment (TEE) established for a network manager node of a network in a distributed computing system, an additional node of the network in the distributed computer system;
determine whether the additional node comprises a second TEE that satisfies an authentication threshold; and
responsive to determining that the additional node comprises the second TEE that satisfies the authentication threshold, set the second TEE of the additional node as a leader for a first set of networking transactions processed by the network in the distributed computing system.

10. The non-transitory computer readable medium of claim 9, wherein to determine whether the additional node comprises the second TEE that satisfies the authentication threshold, the processing device is further to:
send an authentication request to the additional node;
receive attestation data from the second TEE of the additional node, wherein the attestation data is associated with a first communication component executed by the second TEE;
determine whether the attestation data indicates that the first communication component executed by the second TEE is compatible with the communication manager component executed by the first TEE; and
responsive to determining that the attestation data indicates that the first communication component is compatible with the communication manager component executed by the first TEE, determine that the second TEE satisfies the authentication threshold.

11. The non-transitory computer readable medium of claim 10, wherein the attestation data comprises a hash value associated with the first communication component, and wherein the processing device is further to:
validate the hash value associated with the first communication component in view of known valid hash values associated with compatible versions of the communication manager component executed by the first TEE.

12. The non-transitory computer readable medium of claim 9, wherein the processing device is further to:
execute a hardware random number generator component associated with the first TEE to select the additional node from one or more nodes of the network.

13. The non-transitory computer readable medium of claim 9, wherein the processing device is further to:
determine, by the communication manager component, that the first set of networking transactions satisfies a transaction threshold;
select, by the communication manager component, a second node from one or more nodes of the network in the distributed computing system;
determine, by the communication manager component, whether the second node comprises a third TEE that satisfies an authentication threshold; and
responsive to determining that the second node comprises a third TEE that satisfies the authentication threshold, set, by the communication manager component, the third TEE of the second node as the leader for a second set of networking transactions processed by the network in the distributed computing system.

14. The non-transitory computer readable medium of claim 9, wherein the processing device is further to:
responsive to determining that the additional node comprises a second TEE that does not satisfy the authentication threshold:
select, by the communication manager component, a second node from one or more nodes of the network in the distributed computing system;
determine, by the communication manager component, whether the second node comprises a third TEE that satisfies the authentication threshold; and
responsive to determining that the second node comprises the third TEE that satisfies the authentication threshold, set, by the communication manager component, the third TEE of the second node as the leader for the first set of networking transactions processed by the network in the distributed computing system.

15. The non-transitory computer readable medium of claim 9, wherein the processing device is further to:
determine that the additional node is an untrustworthy node for the network; and
notify one or more nodes of the network that the additional node is an untrustworthy node for the network.

16. A system comprising:
a memory; and
a processing device associated with a first trusted execution environment (TEE) established for a first node of a network in a distributed computing system, the processing device coupled to the memory to:

determine that the first TEE of the first node is a leader for a first set of networking transactions processed by the network in the distributed computing system;

determine whether a second node of the network in the distributed computing system comprises a second TEE that satisfies an authentication threshold; and responsive to determining that the second node comprises the second TEE that satisfies the authentication threshold, set the second TEE of the second node as the leader for a second set of networking transactions processed by the network in the distributed computing system.

17. The system of claim 16, wherein the processing device is further to:

determine whether any additional nodes are communicating within the distributed computing environment; and responsive to determining that no additional nodes are communicating within the distributed computing system, set first TEE of the first node as the leader for the network.

18. The system of claim 16, wherein to determine whether the second node comprises the second TEE that satisfies the authentication threshold, the processing device is further to:

send an authentication request to the second node;

receive attestation data from the second TEE of the second node, wherein the attestation data is associated with a communication component executed by the second TEE;

determine whether the attestation data indicates that the communication component executed by the second TEE is compatible with a communication component executed by the first TEE; and responsive to determining that the attestation data indicates that the communication component executed by the second TEE is compatible with the communication component executed by the first TEE, determine that the second TEE satisfies the authentication threshold.

19. The system of claim 18, wherein the attestation data comprises a hash value associated with the communication component executed by the second TEE, and wherein the processing device is further to:

validate the hash value associated with the communication component executed by the second TEE in view of known valid hash values associated with compatible versions of the communication component executed by the first TEE.

20. The system of claim 16, wherein the processing device is further to:

select the second node from one or more additional nodes of the network in the distributed computing system, wherein the selecting comprises:

identify the one or more additional nodes of the network; and execute a hardware random number generator component associated with the first TEE to select the second node from the one or more additional nodes of the network.

* * * * *